United States Patent [19]
Leath et al.

[11] Patent Number: 5,966,640
[45] Date of Patent: Oct. 12, 1999

[54] SATELLITE ANTENNA MANAGEMENT SYSTEM AND METHOD

[75] Inventors: Timothy T Leath, Baltimore; John D Azzolini, Laurel, both of Md.

[73] Assignee: The United States of America as represented by the Administrator of the National Aeronautics and Space Administration, Washington, D.C.

[21] Appl. No.: 08/773,291

[22] Filed: Dec. 24, 1996

[51] Int. Cl.[6] .............................. H04B 7/185; H04B 7/19; H04B 1/02
[52] U.S. Cl. .......................... 455/12.1; 455/13.1; 455/427
[58] Field of Search .................... 455/13.1, 12.1, 455/428, 407, 439, 430, 438, 13.3, 436, 427; 370/322, 325, 316, 324; 342/352

[56] References Cited

U.S. PATENT DOCUMENTS

| | | | |
|---|---|---|---|
| 5,537,679 | 7/1996 | Crosbie et al. | 455/428 |
| 5,590,395 | 12/1996 | Diekelman | 455/113.4 |
| 5,618,012 | 4/1997 | Lehner et al. | 244/168 |
| 5,666,647 | 9/1997 | Maine | 455/13.1 |
| 5,721,810 | 2/1998 | Hahn et al. | 395/50 |
| 5,737,685 | 4/1998 | Locascio et al. | 455/13.1 |
| 5,758,261 | 5/1998 | Weideman | 455/13.1 |
| 5,785,279 | 7/1998 | Gregory | 342/352 |

*Primary Examiner*—Reinhard J. Eisenzopf
*Assistant Examiner*—Edan Orgad

[57] ABSTRACT

The antenna management system and method allow a satellite to communicate with a ground station either directly or by an intermediary of a second satellite, thus permitting communication even when the satellite is not within range of the ground station. The system and method employ five major software components, which are the control and initialization module, the command and telemetry handler module, the contact schedule processor module, the contact state machining module, and the telemetry state machine module. The control and initialization module initializes the system and operates the main control cycle, in which the other modules are called. The command and telemetry handler module handles communication to and from the ground station. The contact scheduler processor module handles the contact entry schedules to allow scheduling of contacts with the second satellite. The contact and telemetry state machine modules handle the various states of the satellite in beginning, maintaining and ending contact with the second satellite and in beginning, maintaining and ending communication with the satellite.

11 Claims, 8 Drawing Sheets

FIG. 9

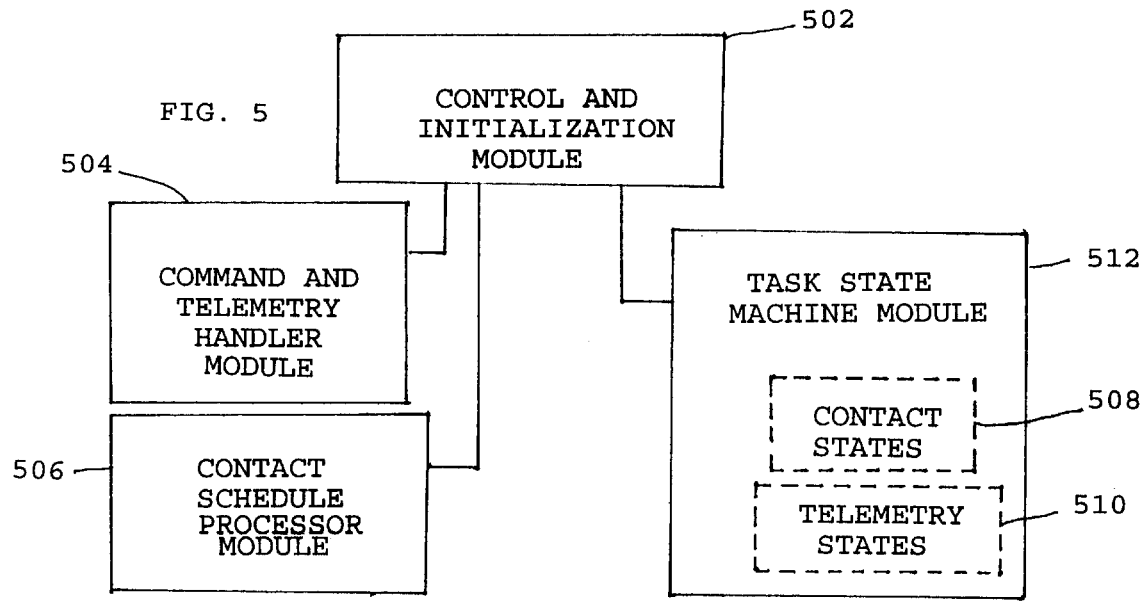
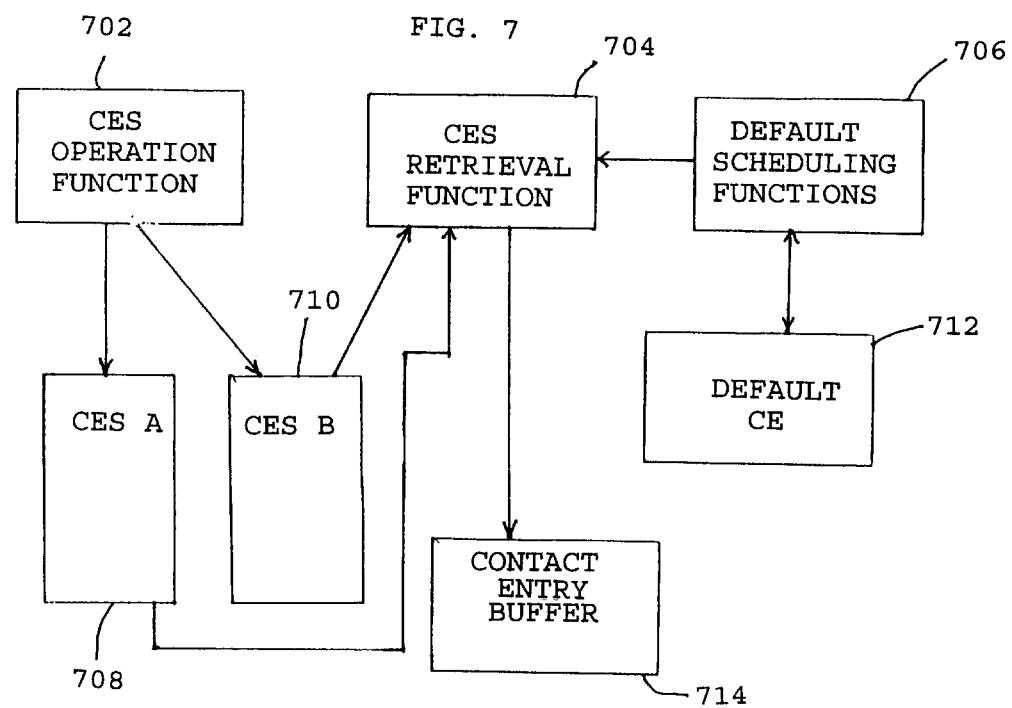

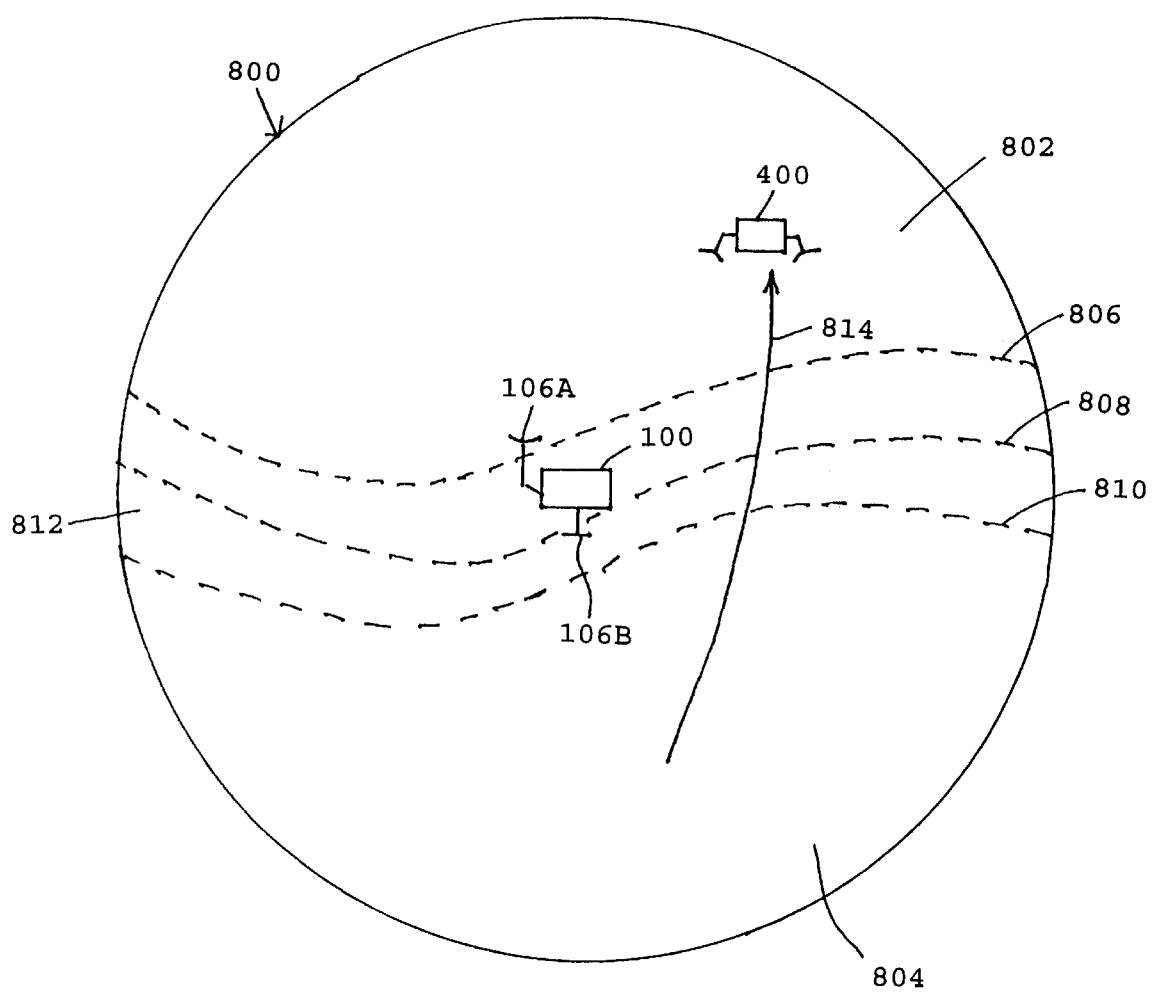

SATELLITE ANTENNA MANAGEMENT SYSTEM AND METHOD

ORIGIN OF INVENTION

The invention described herein was made by employees of the United States Government, and may be manufactured and used by or for the Government for governmental purposes without the payment of any royalties thereon or therefor.

TECHNICAL FIELD

The present invention is directed to a system and method for management of the operations of high-gain antennas on a satellite.

BACKGROUND ART

The X-Ray Timing Explorer (XTE) satellite includes a science payload including a proportional counter assembly, an all-sky monitor and a high-energy X-ray timing experiment. The XTE also includes gimbal-mounted high-gain antennas (HGA's) for communication with the ground station and memory to store information to be transmitted to the ground station so that when the XTE is out of range of the ground station, the information can be stored until the XTE comes back into range. The HGA's send and receive information in a conventional mode known as OMNI mode.

An overview of the XTE is shown in FIG. 1. Satellite 100 includes satellite body 102, solar panels 104 and high-gain antennas 106A, 106B mounted by means of gimbals 108A, 108B.

The X-Ray Timing Explorer (XTE) uses a data system developed by Goddard Space Flight Center known as the "Flight Data System" (FDS). This data system implements packet telemetry and command standards; its internal architecture is based on a fiber optic serial bus known as MIL-STD-1773. FDS uses solid state. recorders to improve system performance and reliability. The hardware uses an Intel 80386 microprocessor, although, of course, other microprocessors could be substituted as needed, and the software provides a distributed modular architecture that is readily extendible to meet new mission requirements.

The FDS receives commands from the ground and delivers them to on-board subsystems. It collects engineering and science data for telemetry transmission to the ground, records data for playback when out of ground contact, and provides autonomous spacecraft operation. It provides real-time control in a distributed multiprocessing environment, packet data communication services and packet data telemetry acquisition.

The design of the hardware is based extensively on the hardware developed for the Small Explorer Data System (SEDS) and the TRMM Spacecraft Data System. SEDS was used on the SAMPEX spacecraft that was launched in July 1992, and it continues to perform successfully.

The software includes an operating system layer, a communication layer and an application layer. The operating system layer uses a commercial multitasking operating system kernel and supports task scheduling and basic inter-task communications. The communication layer includes a software bus and a 1773 scheduler. The software bus provides a standard software interface for sending or receiving data packets, which are in the documented CCSDS format which is known to those skilled in the art, thus allowing the exchange of data among tasks. The 1773 scheduler performs input/output (I/O) operations between FDS software tasks to other components of the satellite along the fiber optic serial bus. The application layer performs such functions as command management, telemetry data acquisition, data storage, telemetry output, spacecraft time maintenance and distribution, spacecraft health and safety management, telemetry data monitoring, antenna management and instrument support. The software further includes a system management function for allowing operators at the ground station to access all layers and more specifically to manage, reconfigure and reload software at all layers.

As shown in FIG. 2, the SDS hardware includes three 1773 buses: attitude control system (ACS) bus 202 connected to attitude control systems such as gimbal control system 208, spacecraft control (S/C) bus 204 connected to critical spacecraft components 210, and instrument bus 206 connected to instruments 212. ACS bus 202 is connected to attitude control processor 214, which includes an 80386 chip or the like. S/C bus 204 is connected to attitude control processor 214, uplink interface 216 and spacecraft control (S/C) processor 218, which also includes an 80386 chip or the like, to allow control of spacecraft components 210 under either ground commands or commands generated on board the satellite Instrument bus 206 is attached to S/C processor 218. Also included are downlink interface 220, memory 222 and transponder 224.

It would be desirable to allow the XTE to communicate with the ground station via a tracking and data relay system satellite (TDRSS). However, such communication is not possible without a way of tracking the relative positions of the XTE and the TDRSS, which are in motion relative to each other as well as to the ground station, and of controlling antennas on the XTE to make contact with the TDRSS.

SUMMARY OF THE INVENTION

It is an object of the invention to provide a system and method for autonomous management of the high-gain antennas of the XTE and the pre-planned transmissions in a manner which is non-predictive, or in other words, based on the actual XTE and TDRSS positions.

It is a further object of the invention to provide such a system and method which meets the following criteria:

- independence of science operations, TDRSS scheduling and the on-board operation of the HGA's and virtual recorders;
- automatic selection and pointing of HGA's, including safepointing/safehold;
- a default mode for the pointing of either antenna to a TDRSS, in the event that there is no communications schedule loaded;
- the ability to configure Command and Data Handling (C&DH) and communications equipment consistent with a three-day communications schedule; and
- maintenance of a record of the most logical transmitter and radio-frequency (RF) switch configuration in the event that the ground commands the XTE to enter transmission mode.

It is a still further object of the invention to provide such a system and method which can handle a multitude of activities relating to configuring the spacecraft for contact with ground operations personnel, such as:

- selecting an antenna and transmitter for each contact;
- configuring the transmitter with proper rates and modes;
- turning on/off the transmitter;

turning on telemetry;

initiating/terminating virtual recorder playback;

pausing/resuming virtual recorder playback around handovers;

computing and controlling HGA handovers;

selecting and configuring antennas during safehold/safepointing; and parking HGA's after contacts.

To achieve these and other objects, the present invention is directed to a system and method which perform the above-noted activities based on the following:

contact entry schedule (CES) buffers which contain information on proposed XTE activities during upcoming contacts with the TDRSS;

look-up tables containing down-link rates and modes;

TDRSS and XTE position data from the attitude control software (ACS) of the XTE;

receiver status from the command ingest (CI) task;

playback status from the telemetry output (TO) and the data storage (DS) tasks; and a robust set of ground commands.

The system and method according to the present invention employ five major software components, which are the control and initialization module, the command and telemetry handler module, the contact schedule processor module, the contact state machine module, and the telemetry state machine module. The control and initialization module initializes the system and operates the main control cycle, in which the other modules are called. The command and telemetry handler module handles communication to and from the ground station. The contact scheduler processor module handles the contact entry schedules to allow scheduling of contacts with the TDRSS. The contact and telemetry state machine modules handle the various states of the XTE in beginning, maintaining and ending contact with the TDRSS and in beginning, maintaining and ending communication therewith. Each major component will be discussed in detail in the detailed description of the preferred embodiment.

BRIEF DESCRIPTION OF THE DRAWINGS

The preferred embodiment of the present invention will now be disclosed with reference to the drawings, in which:

FIG. 5 shows a block diagram of the software modules used in the preferred embodiment of the present invention;

FIG. 7 shows an overview of contact schedule processing according to the preferred embodiment;

FIG. 8 shows the coverage of the two high-gain antennas of the satellite of FIG. 1;

DETAILED DESCRIPTION OF THE INVENTION

Figure 1:
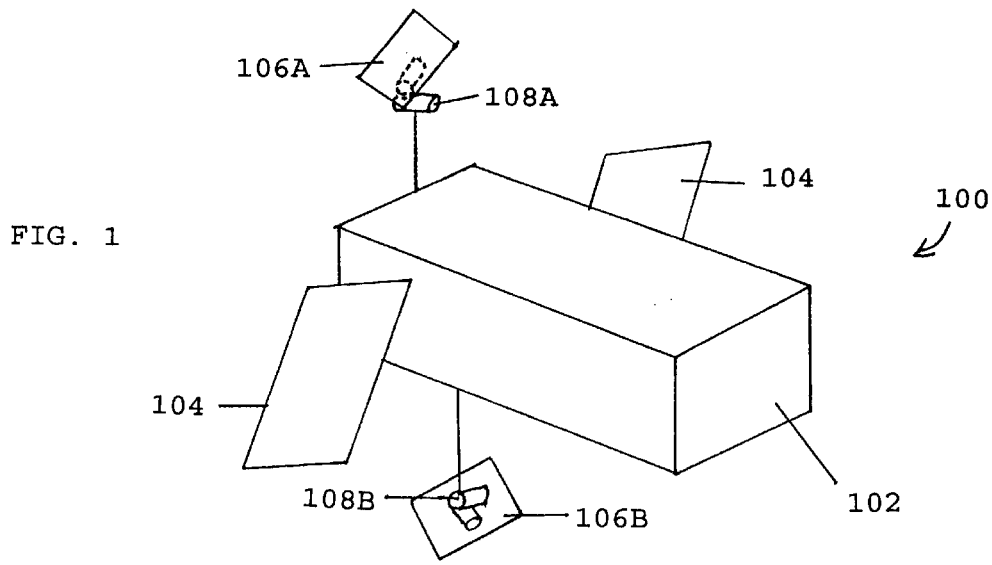
FIG. 1 shows an overview in perspective of a satellite used in both the prior art and the present invention.
Figure 2:
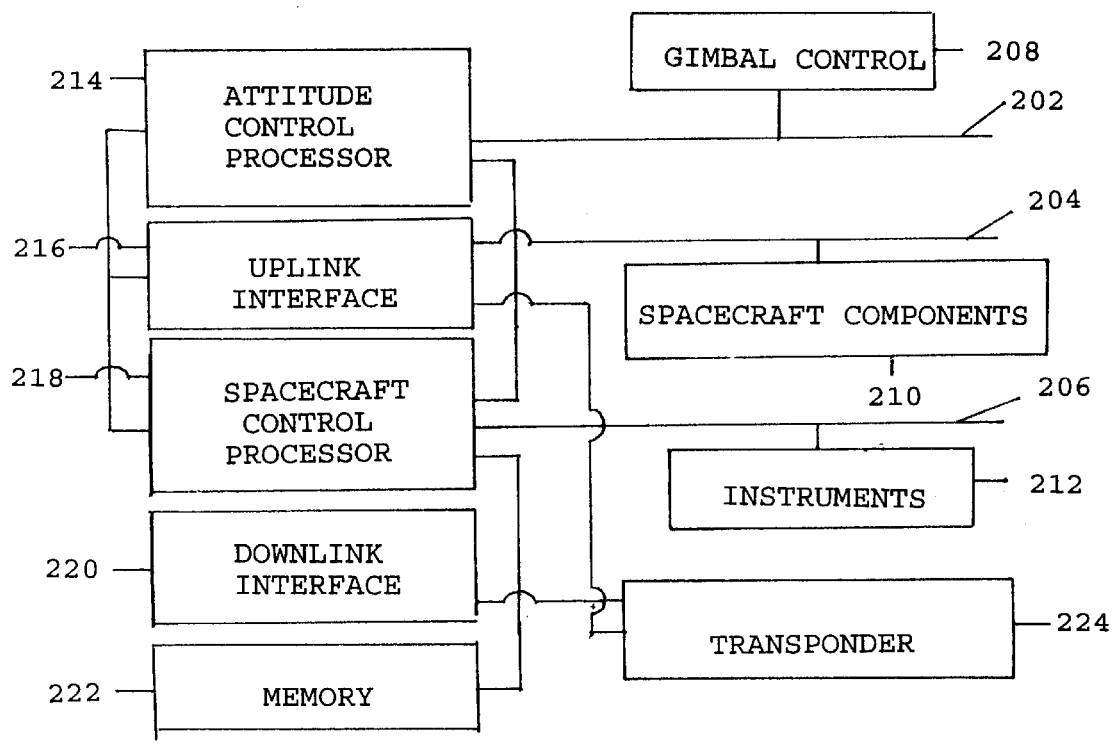
FIG. 2 shows circuitry of the satellite of FIG. 1.
Figure 3:
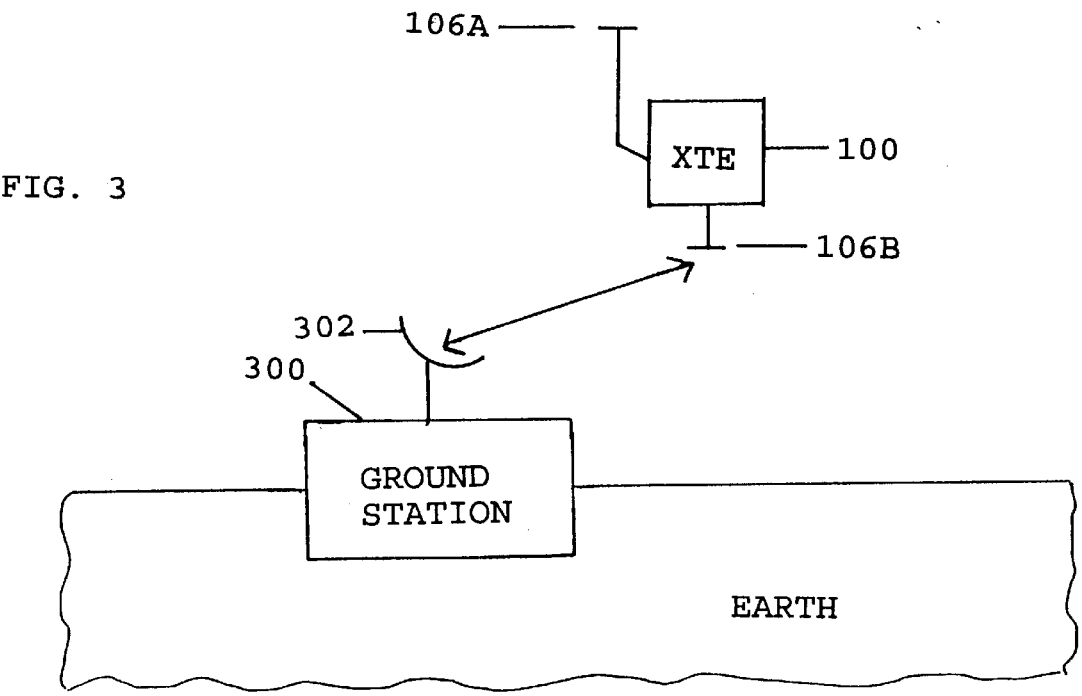
FIG. 3 shows communication between the satellite and a ground station directly.
Figure 4:
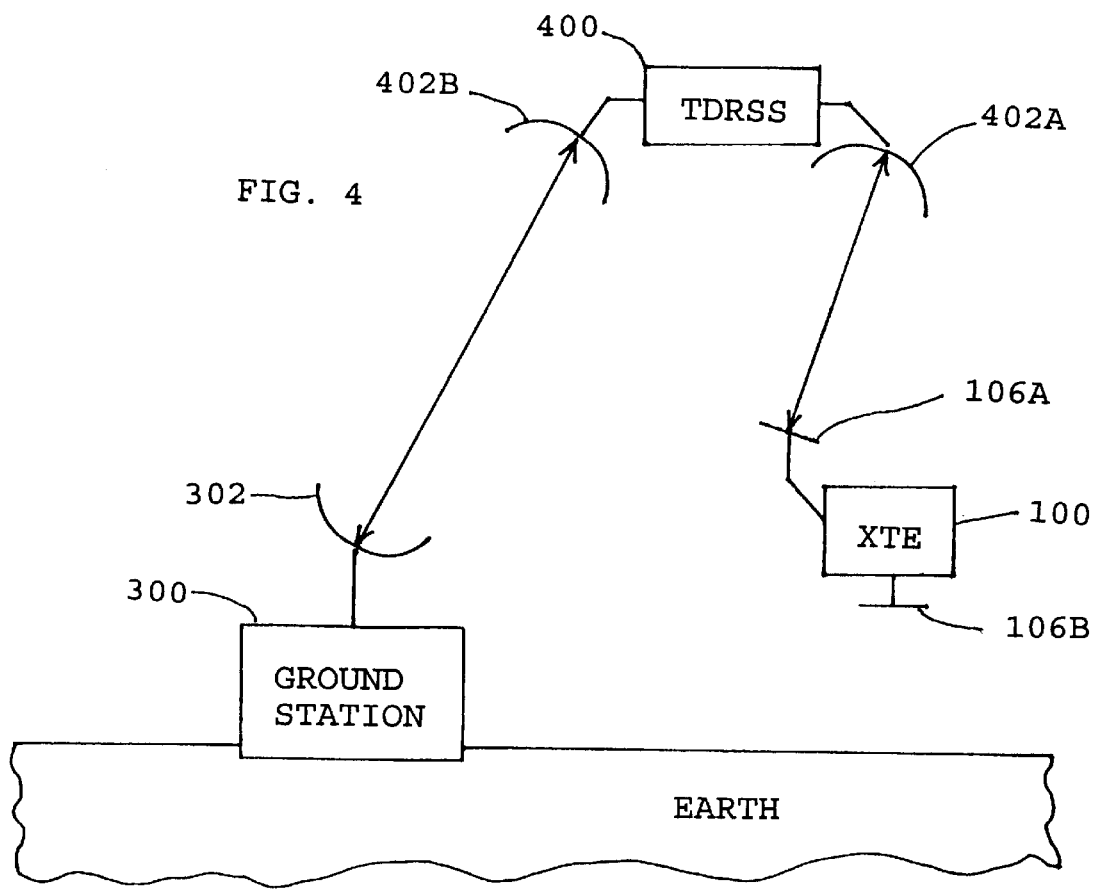
FIG. 4 shows communication between the satellite and a ground station by way of a TDRSS.

According to the preferred embodiment, as shown in FIG. 3, satellite 100 can communicate directly with antenna 302 of ground station 300. In addition, as shown in FIG. 4, satellite 100 can communicate with ground station 300 indirectly by way of TDRSS 400 with antennas 402A and 402B.

The preferred embodiment will now be described in detail with reference to the following acronyms:

1) ACS—Attitude Control Software
2) AM—Antenna Manager
3) AOS—Acquisition of Signal
4) CE—Contact Entry
5) CES—Contact Entry Schedule
6) CI—Command Ingest
7) C&DH—Command and Data Handling
8) DS—Data Storage
9) FDS—Flight Data System
10) HGA—High Gain Antenna
11) HK—Housekeeping
12) LOS—Loss of Signal
13) RF—Radio Frequency
14) RTS—Relative Time Sequence
15) SB—Software Bus
16) SCP—Stored Command Processor
17) SM—Software Manager
18) TDRSS (or TDRS)—Tracking and Data Relay System Satellite
19) TO—Telemetry Output
20) XTE—X-Ray Timing Experiment
21) ZOE—Zone of Exclusion The system and method according to the present invention employ five major software components, which can be implemented on the hardware of satellite 100 described above. These software components, or modules, are control and initialization module 502, command and telemetry handler module 504, contact schedule processor module 506, contact state machine module 508, and the telemetry state machine module 510, the last two of which can be treated as parts of task state machine module 512.

The control and initialization module initializes the system and operates the main control cycle, as will now be described.

There are two types of initialization for an XTE-FDS software task, namely, cold and warm. Initialization occurs when a task is powered-on from an off state or when the XTE-FDS senses that there is a need to restart all software tasks in an effort to eradicate an anomaly. A cold initialization of a task means that the task is going to start from a pre-determined state as though it were starting for the first time from a processor powered-off state. In a warm initialization, a task refreshes itself maintaining a full knowledge of its processing state prior to the warm restart.

During a cold initialization, the control and initialization module performs the following: It disables processing of the task state machines. It nulls out the contact schedule processor (CSP) control table. It nulls out contact entry schedule (CES) buffers and associated structures. It nulls out the internal ACS 1 Hz updates table values and flags. It nulls out the internal receiver status updates table. It nulls out the internal playback status updates table. It sets the transmitter selection table entries to XMITTERA(0) and XMITTERB (1) respectively. It sets the current contact entry (CE) Buffer to the following:

```
/* Initialize Contact Entry Buffer Info */
ce.info.ce_num = 0
ce.info.aos_secs = 0
ce.info.los_secs = 0
ce.info.dl_config_code.rate_combination_index = 0
ce.info.dl_config_code.filter_table = 0
ce.info.pb_rcdr_mask = 0
ce.info.cpb_rcdr_mask = 0
ce.info.pb_strt_enable = 0
ce.info.dl_config_code.transmission_type = HGA
ce.info.dl_config_code.transmission_mode = NONCOHERENT
ce.info.target_tdrss = NO_TDRSS_TRACKING
ce.info.automatic_cntrl_enable = FALSE
ce.info.handovers_enable = FALSE
ce.info.initial_ant_select = AUTO
ce.info.no_op = FALSE
ce.latt = 0.0
ce.longitude = 0.0
ce.omni_cmded_on = FALSE
ce.jump_pend_enable = FALSE
ce.info.switch_pend_enable = FALSE
ce.load_default_ces = FALSE
ce.ce_to_jump_to = 0
ce.handover_flag = FALSE
ce.antenna = HGAP
ce.xmitter = XMITTER1
ce.contact_state = WAITING
ce.telemetry_state = TLM_OFF
ce.last_switch_zone = HANDOVER_ZONE
ce.acs_info_error = FALSE
ce.deep_smachine_error = FALSE
ce.prev_cntrl_enable_value = TRUE
ce.in_zoe = FALSE
ce.grndcmded_default_ce = FALSE
It also sets the Housekeeping buffer to the following:
/* Initialize Housekeeping Info */
/* Fast */
am_hk.cmd_cntr = 0
am_hk.cmd_err_cntr = 0
am_hk.csp_grnd_req_ctr = 0
am_hk.csp_grnd_req_err_ctr = 0
am_hk.csp_patch_ctr = 0
am_hk.csp_patch_err_ctr = 0
am_hk.csp_load_ctr = 0
am_hk.csp_load_err_ctr = 0
am_hk.curr_ce_num = 0
am_hk.next_ce_num = 0
am_hk.curr_ce_pointing_err = 0
am_hk.curr_ce_tdrss_latt = 0.0
am_hk.curr_ce_tdrss_long = 0.0
am_hk.am_processing_enabled = FALSE
am_hk.no_acs_update_flag = TRUE
am_hk.invalid_quaternion = TRUE
am_hk.no_tdrss_ephem_flag = TRUE
am_hk.no_xte_ephem_flag = TRUE
am_hk.curr_ce_tdrss_occulted = FALSE
am_hk.lock_ok = FALSE
am_hk.omni_cmded_on = FALSE
am_hk.pb_cmded_on = FALSE
am_hk.jump_pending = FALSE
am_hk.curr_ce_switch_pend = FALSE
am_hk.next_ce_switch_pend = FALSE
/* Slow */
am_hk.curr_ces_id_or_state = IDLE
am_hk.cesa_status = NOT_LOADED
am_hk.cesb_status = NOT_LOADED
am_hk.load_default_ces_flag = FALSE
am_hk.default_tdrss_east = NO_TDRSS_TRACKING
am_hk.default_tdrss_west = NO_TDRSS_TRACKING
am_hk.ce_to_jump_to = 0
am_hk.curr_ce_aos = 0
am_hk.curr_ce_los = 0
am_hk.curr_ce_rate_cndx = 0
am_hk.curr_ce_filter_tbl = 0
am_hk.curr_ce_pbrcdr_mask = 0
am_hk.curr_ce_cpbrcdr_mask = 0
am_hk.curr_ce_pbstrt_enable = FALSE
am_hk.curr_ce_trans_type = HGA
am_hk.curr_ce_trans_mode = NONCOHERENT
am_hk.curr_ce_target_tdrss = NO_TDRSS_TRACKING
```

-continued

```
am_hk.curr_ce_auto_cntrl = FALSE
am_hk.curr_ce_handover_ena = FALSE
am_hk.curr_ce_init_ant = AUTO
am_hk.curr_ce_noop = FALSE
am_hk.curr_ce_antenna = AUTO
am_hk.curr_ce_xmitter = XMITTER1
am_hk.curr_ce_cstate = WAITING
am_hk.curr_ce_tstate = TLM_OFF
am_hk.last_acs_upd_timer = 0
am_hk.curr_ce_startpb_timer = 0
am_hk.curr_ce_switch_time = 0
am_hk.next_ce_aos = 0
am_hk.next_ce_los = 0
am_hk.next_ce_rate_cndx = 0
am_hk.next_ce_filter_tbl = 0
am_hk.next_ce_pbrcdr_mask = 0
am_hk.next_ce_cpbrcdr_mask = 0
am_hk.next_ce_pbstrt_enable = FALSE
am_hk.next_ce_trans_type = NOT_TRANSMITTING
am_hk.next_ce_trans_mode = NONCOHERENT
am_hk.next_ce_target_tdrss = NO_TDRSS_TRACKING
am_hk.next_ce_auto_cntrl = FALSE
am_hk.next_ce_handover_ena = FALSE
am_hk.next_ce_init_ant = AUTO
am_hk.next_ce_noop = TRUE
```

On either a cold or a warm initialization, the task global receiver lock flag is disabled.

Figure 6:
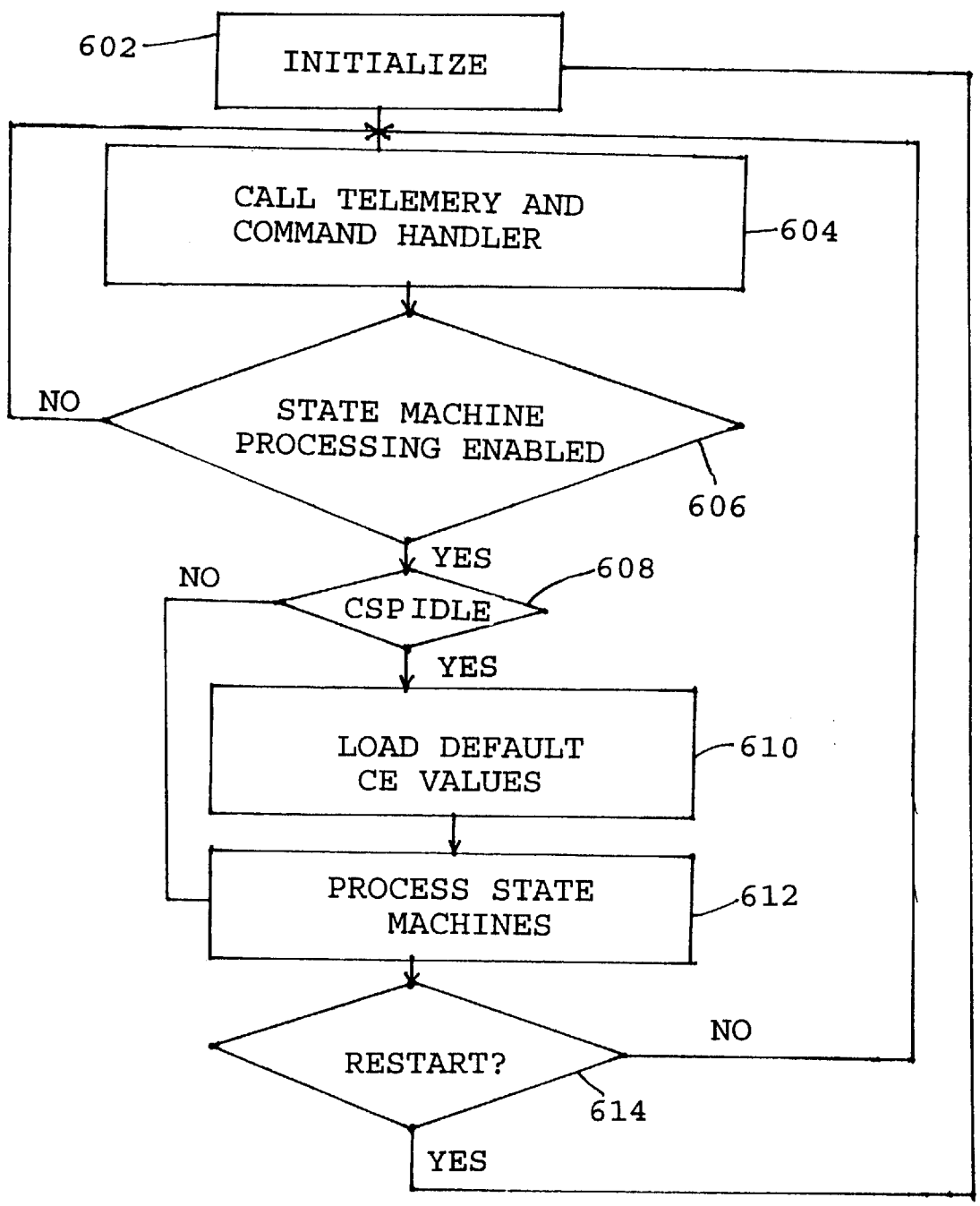
FIG. 6 shows a flow chart of the main control cycle of the preferred embodiment.

As seen in FIG. 6, after initialization 602, AM enters its main control cycle, where it obtains the present time in elapsed seconds since the XTE mission epoch of Jan. 1, 1993. AM then calls the telemetry and command handler (step 604) to process its two software bus (SB) input pipes. The first pipe is a dedicated communication port between the AM and the ACS tasks. The ACS task nominally sends telemetry data over this pipe to AM at 1 Hz; consequently, AM's main control cycle is synchronized by the receipt of these data. As for the second pipe, it provides AM with all other inputs (i.e., receiver lock status, playback status, SM load/patch commands and all ground commands).

If state machine processing has been enabled via a ground command (step 606), then AM makes a determination on the control state of the contact schedule processor (CSP) (step 608). If the CSP is idle (meaning that a CES is not executing on the CSP and/or the CES buffers are not loaded), then AM calls on the CSP to load its default contact entry (CE) values into the current CE buffer for processing by the state machines (step 610). This operation will be described in greater detail below when the contact entry scheduler is described in detail.

Based on the contents of the current CE buffer, AM processes a state in both the contact and the telemetry state machines within the current cycle (step 612). This operation will be described in greater detail below when the state machines are described in detail.

The main control cycle is repeated continuously, until such time as a cold or warm restart (step 614) of the spacecraft normal mode processor occurs.

AM calls telemetry and command handler module 504 from the main control cycle to process the two software bus (SB) input pipes.

Special ACS/AM 1 Hz telemetry packet retrieval is a little more complicated than just capturing a data packet once a second. After being called by the main control cycle, the telemetry and command handler pends on the special ACS/AM 1 Hz pipe until a telemetry packet is received or until a time out period of two seconds has been exceeded.

Then the telemetry and command handler initiates its catch-up logic for the first pipe so that the AM can perform its operations on the most current ACS information available for the current cycle. Specifically, the telemetry and command handler will continue to pend on the first pipe until there are no more packets available or until the amount of packets processed is three. This "catch-up" logic allows for processing a maximum of four special ACS telemetry packets within a cycle under the following conditions: SB pipe queue full (which means the allotted storage capacity for a pipe has been achieved); and SB pipe buffer overrun (which means the allotted storage capacity for the pipe has been exceeded and the latest packets are now been dropped).

It is important to note that the storage queue for the first pipe is only one telemetry packet deep.

Once the telemetry and command handler is satisfied that it has the last good packet, it stores the packet contents into the internal AM/ACS 1 Hz updates table and records the time.

There are the following three types of anomalies that can occur while attempting to retrieve the special ACS/AM telemetry: an unlikely SB packet routing error; an ACS/AM telemetry packet content error (i.e. bad quaternion or bad ephemeris for the spacecraft or the target TDRSS); or an ACS/AM telemetry packet "dropout" error (meaning that the last good telemetry packet was received more than ten seconds ago). The first anomaly type is handled by sending an event message and maintaining the last good telemetry packet. However, upon initial recognition, the remaining two anomaly types trigger the following actions: turning off all types of playback and the selected transmitter (only after natural LOS) for the current CE via stored command processor (SCP) relative time sequence (RTS) initiation; storing the current CE's automatic control enable flag value and then setting it to false; setting the current CE's contact state to the "Waiting for Contact" state; and setting the current CE's telemetry state to the "Telemetry Off" state. The aforementioned sequence of actions renders the current CE "IDLE" until AM recognizes that the anomalous situation that occurred has been corrected.

The actual retrieval of packets from the second SB pipe is not so complicated as the retrieval processes for the first SB pipe. The telemetry and command handler checks the second pipe until there are no packets to retrieve, or until a maximum of sixteen packets have been processed for the current cycle. Each telemetry or command packet is processed as it is received; consequently, it is strongly recommended that close attention be focused on how AM is commanded so that there will be no commanding logic collisions within a cycle. It is important to note that the storage queue for the second pipe is only eleven packets deep.

Although the actual packet retrieval for the second pipe is simple in comparison to the first pipe, the telemetry and command handler has, to process several different types of telemetry and command packets from the second pipe, such as:

TO and DS playback telemetry updates;
CI receiver lock status updates;
SM/AM load/patch CES on-board handshake;
ground reset AM counters command;
ground enable/disable of state machine processing;
ground commanded contact schedule processing;
ground commanded OMNI mode transmission; and
housekeeping broadcast command.

The telemetry and command handler receives both the telemetry output (TO) and the data storage (DS) housekeeping telemetry packets every four seconds from the second AM SB pipe. From these two packets, AM determines whether playback has been commanded on, and AM determines the state of each virtual recorder.

Specifically, the telemetry and command handler extracts one telemetry item, "Playback_Paused", from the TO housekeeping packet. If this item is true, then AM globally recognizes playback to be commanded off; otherwise, AM recognizes playback to be globally commanded on.

As for the DS housekeeping packet, AM extracts and stores the Continuous_Playback_on flag, the Playback_in_Progress flag and the Dump_in_Progress flag for each virtual recorder. The Dump_in_Progress flag information is not currently used by AM but remains to allow for future capability enhancements.

All of the playback telemetry updates are stored in the internal AM playback updates table.

The telemetry and command handler receives the Command Ingest (CI) housekeeping telemetry packet every four seconds from the second AM SB pipe. AM determines whether receiver lock is functioning correctly from this packet. Specifically, the telemetry and command handler extracts and stores the following telemetry items from the CI housekeeping packet: the CI_Active_Uplink and the Uplink_Hardware_Status for both transponders on uplink cards A or B (based on the CI_Active_Uplink value).

If the current CE's down-link configuration transmission mode is coherent, then AM determines if hardware transponder lock is functioning correctly for the current CE's antenna/transmitter combination. When the corresponding hardware transponder lock flag from CI is true, then the telemetry and command handler sets its AM receiver lock global to true; otherwise, it is set to false. If the current CE's down-link configuration transmission mode is noncoherent, then the telemetry and command handler always sets its AM receiver lock global to true. All of the receiver lock status telemetry updates are stored in the internal AM receiver lock updates table.

For loading and patching of the AM-CES buffers, there is a handshaking process between the software manager (SM) and the AM task. The process begins after the ground has loaded the SM working buffer with a CES load or patch and has requested that the working buffer be committed to active RAM; consequently, SM sends a load or patch commit request to the AM telemetry and command handler. At this time, the telemetry and command handler checks to see if it can interpret the CES ID provided in the commit request. If it can not, then it sends an event message and increments the appropriate error counter. Otherwise, it will call the CSP Load or Patch CES functions that will parse through the contents of the working buffer and send a commit reply of success or failure to SM. Further details will be given below in the description of contact schedule processing.

When received by the telemetry and command handler, the ground reset counters command sets the following counters to a null value:

the Total Command Counter (i.e. am_hk.cmd_cntr) which represents load, patch and ground commands processed counts;
the Total Command Error Counter (i.e. am_hk.cmd_err_cntr) which represents load, patch and ground erroneous commands processed counts;
the Ground Request Counter which represents all ground commands processed by the AM task (i.e. am_hk.csp_grnd_req_ctr);
the Ground Request Error Counter which represents all erroneous ground commands processed by the AM task (i.e. am_hk.csp_grnd_req_ctr);
the CES Load Request Counter which represents all SM successful load commit request commands processed by the AM CSP (i.e. am_hk.csp_load_ctr);

the CES Load Request Error Counter which represents all SM failed load commit request commands processed by the AM CSP (i.e. am_hk.csp_load_err_ctr);

the CES Patch Request Counter which represents all SM successful patch commit request commands processed by the AM CSP (i.e. am_hk.csp_patch_ctr); and the CES Patch R failed patch commit request commands processed by the AM CSP (i.e. am_hk.csp_patch_err_ctr).

When received by the telemetry and command handler, the ground enable AM state machine processing command cannot be processed unless the following conditions are true:

OMNI Mode has not been commanded on via AM ground command;

an invalid quaternion has not been detected in the special ACS/AM telemetry packet during the current cycle;

valid spacecraft and TDRSS ephemeris has been provided in the special ACS/AM telemetry packet for the current cycle; and AM is not currently encountering the ACS/AM 1 Hz telemetry "Dropout" anomaly.

Once it has been determined that it is safe to process the enable command, the telemetry and command handler will set its global AM processing enable flag to true, allowing the main control cycle to initiate AM's state machine processing. If the main control cycle detects that the CSP is not executing, then default scheduling will be initiated.

As for the ground disable AM state machine processing command, it immediately sets the global AM processing enable flag to false upon receipt by the telemetry and command handler.

It is important to note that it is possible to enable/disable or disable/enable AM state machine processing within the same cycle; therefore, care should be taken not to send the commands too close together in time, or they could nullify each other.

Since the contact schedule processor (CSP) is basically a collection of functions used throughout the AM task to manipulate the regular and default contact entry schedules, the telemetry and command handler is capable of receiving ground commands that allow for real-time manipulation of schedules. Specifically, the telemetry and command handler is capable, via ground command, of the following:

starting and stopping CES execution by the CSP;

switching to the currently inactive CES buffer;

patching the flags of a CE within a CES buffer;

jumping to a CE within a CES buffer;

using the default CE as the next CE; and ending the current CE.

The telemetry and command handler does not allow the ground to start a CES on the CSP if the CSP is currently executing a CES or if the requested CES is empty. If the CES can be started, an attempt will be made to find the first CE whose loss of signal time is greater then the present time. If at least one CE is found, then the following occurs:

the CSP control state is set to "EXECUTING";

default scheduling for the next CE is disabled if necessary;

telemetry and transmitters are turned off if necessary;

the CE information from the newly activated CES is stored in the current CE buffer; and an event message is sent to acknowledge success.

If the ground receives an event message indicating that all CE's were skipped in the CES, this means that all the CE's were found to be in the past; consequently, the CES could not be activated on the CSP.

A STOP CES ground command will cause the telemetry and command handler to verify that the CSP is executing. If the CSP is executing, then the telemetry and command handler will kill execution of the currently active CES on the CSP by setting the CSP Control State to idle. An event message is sent to acknowledge success or failure.

A switch to the currently inactive CES command will cause the telemetry and command handler to call a CSP function to perform the following:

verify that the CSP is currently executing a CES;

determine if the currently inactive CES has CE's ; and determine if there is no switch pending at the end of the current CE already.

If it is safe to switch, then the current CE's switch pend flag will be set to "true." The switch pend flag will be serviced at the LOS of the current CE or upon receipt of the END CURRENT CE command. An event message is sent to acknowledge success or failure.

A patch CE flags command will cause the telemetry and command handler to change the flags for the current or a future CE in the active CES. The following flags are "patchable":

the Playback Start Enable flag which allows AM automatic start of telemetry playback for the CE if set to true;

the Playback Recorder Mask which allows AM to change the virtual recorder mask for SCP-RTS activated telemetry playback for the CE (It is strongly recommended not to alter this field for the current CE);

the Automatic Control Enable flag which allows AM automatic operations for the CE;

the Handovers Enable flag which AM to perform automatic HGA handover if set to true; and the No Operations flag which allows AM to skip a future CE totally or end the current CE if set to true.

An event message is sent to acknowledge success or failure.

The telemetry and command handler will call a CSP function when it is has been requested to JUMP TO A CE in the active CES. That CSP function will not allow the jump if a CES switch is pending at the end of the current CE or if the CE to jump to is not loaded in the CES. If it is determined that it is safe to jump, the jump will actually occur at the end of the current CE.

A USE DEFAULT CE command will cause the telemetry and command handler to set the global load default CE flag to true so that the default CE will be executed at the end of the current CE. In the case that CSP default scheduling is already in progress, the execution of this command has no effect and CSP default scheduling will continue without interruption; however, in the case that a CES is active on the CSP, then a global ground commanded default CE flag is set to true to alert the CSP of a single default CE request that will now occur at the end of the current CE. At the end of the default CE execution, the CSP will continue processing the active CES.

The END CURRENT CE command will cause the telemetry and command handler to call a contact state machine function that will:

turn off all types of playback and turn off the present antenna/transmitter combination via SCP-RTS activation if necessary (i.e. the "Telemetry Off" state); and call on a CSP function to get the next CE and put it into the current CE buffer.

Upon receipt, the enable OMNI Mode Transmission command causes the telemetry and command handler to perform the following:

turn off all types of playback and turn off the present antenna/transmitter combination via SCP-RTS activation (i.e. the "Telemetry Off" state);

select the other OMNI antenna/transmitter combination based on what was being used at the execution of this command;

change the current CE buffer to reflect an OMNI antenna transmission type and a "NONCOHERENT" transmission mode;

configure RF and Down-link via SCP-RTS activation;

change the current CE's Down-link Configuration Code to reflect the newly commanded rate combination index and filter table;

send a command to TO to start telemetry based on the current CE's Down-link Configuration Code; and set the current CE's OMNI Mode Commanded On flag to true and set the AM State Machine Processing flag to false.

The telemetry and command handler will verify that OMNI mode transmission has been commanded on via AM ground command before disabling OMNI mode transmission. If it has been determined that OMNI mode transmission has not been commanded on via AM ground command, then an event message is sent and the appropriate error counter is updated; otherwise, the current CE's Omni Mode commanded on flag is set to false and all types of playback are turned off as well as the present antenna/transmitter combination being turned off via SCP-RTS activation (i.e. the "Telemetry Off" state is achieved). It is important to note that it is possible to enable/disable or disable/enable OMNI Mode Transmission within the same cycle; therefore, care should be taken not to send the commands too close together in time or they could nullify each other.

The telemetry and command handler will be issued a broadcast command to send out housekeeping telemetry every four seconds. Upon receipt of this command, AM housekeeping telemetry will been packetized and sent over the SB to the housekeeping (HK) task.

Time fields in the AM HK packet will be word swapped. If the CSP determines that there is no CE to be processed next, then value of −1 will be stored in the next CE number field and the remaining next CE fields will have the following values:

```
am_hk.next_ce_num = -1
am_hk.next_ce_aos = 0
am_hk.next_ce_los = 0
am_hk.next_ce_rate_cndx = 0
am_hk.next_ce_filter_tbl = 0
am_hk.next_ce_pbrcdr_mask = 0
am_hk.next_ce_cpbrcdr_mask = 0
am_hk.next_ce_pbstrt_enable = FALSE
am_hk.next_ce_trans_type = HGA
am_hk.next_ce_trans_mode = NONCOHERENT
am_hk.next_ce_target_tdrss = NO_TDRSS_TRACKING
am_hk.next_ce_auto_cntrl = FALSE
am_hk.next_ce_handover_ena = FALSE
am_hk.next_ce_init_ant = AUTO
am_hk.next_ce_noop = TRUE
am_hk.next_ce_switch_pend = FALSE
```

Command schedule processing will now be described on detail. A significant concept underlying Contact Schedule Processing is Contact Entry (CE). A CE is a 26 byte information structure that is comprised of 16 information items or fields. Each CE is symbolic of the proposed XTE communications contact activities during a period within an orbit. These CE periods should not exceed the allotted time for a TDRSS pass, which is approximately 55 minutes. The nominal CE period is 30 minutes. The CE is the rudimentary structure of a contact entry schedule (CES). The following table provides a detailed description of the CE structure and content:

| Word number (each word = 2 bytes) | Name of entry | Data type | Comments |
|---|---|---|---|
| 1 | Contact entry number | unsigned word | The identifying label for a CE, with a range of 1 to 150 |
| 2 | Acquisition of signal | u_dword time tag | The CE start time in seconds since epoch |
| 3 | Loss of signal | u_dword time tag | The CE stop time in seconds since epoch |
| 4 | Playback start enable flag | unsigned byte | A value of one means that playback can be initiated during this CE. |
| 5 | Downlink configuration code | 32-bit structure with 4 items | |
| 5a | Rate combination index for TO | unsigned byte | This parameter has the same specifications as the TO cmd parameter |
| 5b | Filter Table for TO | unsigned byte | This parameter has the same specifications as the TO cmd parameter |
| 5c | TLM Transmission Type | unsigned byte | This parameter can be specified as HGA(1) or OMNI(2) |
| 5d | TLM Transmission Mode | unsigned byte | This parameter can be specified as COH1(1), NONCOH1(0), COH2(3) or NONCOH2(2) |
| 6 | Target TDRSS | unsigned word | This parameter can be specified as 1 through 4 or 0 for not transmitting. When not transmitting, AM will set the automatic control enable flag for this CE to false. |
| 7 | Playback recorder mask | unsigned word | This parameter's six LSB specify RTS activation for playback recorders. |
| 8 | Continuous playback recorder mask | unsigned word | spare |
| 9 | AM automatic control enable flag (for single CE) | unsigned byte | A value of one enables automatic operations for the duration of the current CE. |
| 10 | Handovers enable flag | unsigned byte | A value of one enables handover operations for the current CE. |

-continued

| Word number (each word = 2 bytes) | Name of entry | Data type | Comments |
|---|---|---|---|
| 11 | Initial antenna select | unsigned byte | This parameter can be specified as HGAP(0), HGAM(1) or AUTO(3). This parameter is interpreted as OMNIA(0), OMNIB(1) or AUTO(3) when the transmission type for this CE is OMNI. |
| 12 | No Operations Flag | unsigned byte | A value of one tells AM to skip this CE and process the next CE in time. |
| 13 | Switch Pending Enable Flag | unsigned byte | A value of one tells AM to switch to the inactive CES at the end of this CE. This should be used only in the last CE of a CES. |

The main purpose of the Contact Schedule Processor (CSP) is to manage two CES's and one logical default schedule that is used when there is no active or loaded CES. Each CES has a CE capacity (~4 K bytes each) that is sufficient for three days based on the following assumptions:
a 90 minute XTE orbit;
3 CE's or contacts per orbit;
15 orbits per day;
45 CE's or contacts per day; and,
15 spare CE's.
Thus, the maximum number of CE's per CES is 150.

The CSP is actually a library of functions that allow AM to globally manage and manipulate CE's. These functions can basically be decomposed into three groups as shown in FIG. 7, which are CES operations functions 702, CES retrieval scheduling functions 704 and default scheduling functions 706.

The CES operations functions handle the details of loading the inactive CES (from among the two CES's, CES A 708 and CES B 710), patching the active CES, starting a CES when the CSP is idle, switching to the inactive CES when the CSP is executing and stopping a CES when the CSP is executing it.

When the CSP processes a LOAD CES request, it stores the pre-load state of the CSP so that it can restore the CSP if a load error is detected. The CSP then parses through the SM working buffer to perform load sizing and load content tests. The load sizing test performed by the CSP merely checks to see if the requested load will fit within a CES; however, the load content test performs an individual CE level verification that entails the following:
checking to see that there is enough time to end and start a TDRSS pass between any time ordered pair of CE's; and
checking to see that there is enough time to start and stop playback within each CE.
If the load passes the CSP tests, then the load is copied into the requested CES buffer, and a commit success reply is sent to SM.

For a PATCH CES request, the CSP stores the pre-load state of the CSP so that it can restore itself if a patch error is detected. The CSP then parses through the SM working buffer to perform patch sizing and patch content tests. The patch sizing test performed by the CSP merely checks to see if the requested patch will fit within an active CES's remaining buffer space; however, the patch content test performs an individual CE level verification that entails the same testing performed on a load with the additional requirement to determine that there are no duplicate CE's within the patch.

If the patch passes the CSP tests, then the patch is copied into the requested active CES buffer, and a commit success reply is sent to SM.

When the CSP processes a START CES request, it attempts to find a time ordered CE whose LOS is greater than the present time. All CE's in the past are marked as being skipped. If at least one CE is found, then the following occurs:
the CSP control table is updated with the CES ID, the CE Number and the time index pointer of the CE; and
the CSP control table is also updated with a Next CE Number value of −1 if there is only one CE in the CES that is in the present or the future.

The SWITCH CES request is serviced by the CSP only at the end of the current CE. Since the request to switch could have occurred at current CE.LOS—X time ago, the CSP determines if a CES is still active on the CSP. If the CSP is still executing a CES, then it determines which of the CES's is the new CES to switch to, and it initiates the start process for that CES.

In order to stop an active CES, the CSP simply kills CES operations by setting the CSP control state to idle.

Default scheduling functions 706 actually manage one CE, namely, default CE 712, and continuously updates that CE's timing (i.e., AOS and LOS) and TDRSS information to create a logical default schedule. If AM contact state machine processing is enabled and the CSP is idle, then default scheduling will be activated; furthermore, a default CE can be commanded from the ground.

The default CE buffer values are:

```
/* Default Contact Entry Buffer Info */
ce.info.ce_num >= 1000
ce.info.aos_secs = present time for the current cycle and = present start (2 mins.) times ce.info.los_secs
time for the current cycle + the Default TDRSS PASS time (55 mins.) ce.info.dl_config_code.rate_combination_index = 3
ce.info.dl_config_code.filter_table = 5
ce.info.pb_rcdr_mask = 0
ce.info.cpb_rcdr_mask (spare) = 0
ce.info.pb_strt_enable = FALSE
ce.info.dl_config_code.transmission_type = HGA
ce.info.dl_config_code.transmission_mode = NONCOHERENT
ce.info.target_tdrss = West/East
based on occultation ce.info.automatic_cntrl_enable = TRUE
ce.info.handovers_enable = TRUE
ce.info.initial_ant_select = AUTO
ce.info.no_op = FALSE
ce.latt = 0.0
ce.longitude = 0.0
ce.omni_cmded_on = FALSE
ce.jump_pend_enable = FALSE
ce.info.switch_pend_enable = FALSE
ce.load_default_ces (if ground commanded) = FALSE
ce.ce_to_jump_to = 1
ce.handover_flag = TRUE
ce.antenna = HGAP
ce.xmitter = XMITTER1
```

-continued

```
ce.contact_state = WAITING
ce.telemetry_state = RT_END
ce.last_switch_zone = POS_ZONE
The following items are set based on the actual conditions they represent:
ce.acs_info_error
ce.deep_smachine_error
ce.prev_cntrl_enable_value
ce.in_zoe
ce.grndcmded_default_ce
```

CE Retrieval functions 704 handle obtaining the next CE to be loaded into contact entry buffer 714 in the memory and processed by AM based on the following prioritized look at the retrieval requests made during the last CE period:

a request for a default CE is processed first;

a request for a switch is processed second;

a request for a jump is processed third; and a pre-scheduled CE from the active CES is processed next if there were no ground request made to alter scheduling.

Since the request to jump could have occurred at current CE.LOS—X time ago, the jump could cause a CSP time ordering error because the CE to jump to could now be in the past.

If the CSP reaches the end of a CES without detecting a switch request, it will kill the active CES and initiate default scheduling.

The state machine modules will now be described in detail.

In order to comprehend AM state machine processing, one has to understand the communications characteristics surrounding the physical XTE HGA configuration, which will be explained with reference to FIG. 8. As noted above, XTE 100 has two high-gain antennas 106A and 106B that provide it with spherical coverage region 800 for tracking target TDRSS 400. Upper antenna 106A provides upper coverage region 802 having lower boundary 810. Lower antenna 106B provides lower coverage region 804 having upper boundary 806. There is thus shared region 812 of coverage between the two antennas which is referred to as the handover zone by AM. When in the handover zone, AM uses switch curve 808 and the current direction of the track to determine which antenna to use to continue tracking the desired TDRSS as it moves along trajectory 814. The switch curve is a latitude-amplitude plot having a shape of a cosine wave. The handover zone is a default of 0.5 degrees bias about the switch curve.

As noted above, AM functions not only to control the HGA's, but also to control playback telemetry during contacts with a TDRSS. Accordingly, AM will have to start, pause, resume or stop playback telemetry when it encounters situations such as HGA contact initiation, HGA handovers, zone of exclusion and HGA contact termination; to fulfill this latter function, AM includes a task state machine that actually includes two smaller state machines called the contact and telemetry state machines. Since telemetry playback is contingent on antenna contact, it is important to note that the AM telemetry state machine execution and transition are contingent on execution and transition of the contact state machine.

Generally, AM is able to traverse the various states based on the following:

the current CE buffer contents; and the actual XTE and TDRSS position information provided in the special ACS/AM 1 Hz packet.

More specifically, AM uses the aforementioned data combination to compute the existence of HGA/TDRSS occultation, pointing error and track direction with respect to the switch curve. When in the appropriate state, AM will command the ACS task in the following manner:

|  | Track indefinitely | Slew park | Stop park | Index park |
|---|---|---|---|---|
| HGA ID | HGAP/ HGAM | HGAP/ HGAM | HGAP/ HGAM | HGAP/ HGAM |
| TDRSS ID | East or West | East or West | East or West | East or West |
| Index Rag | 0 | 1 | 1 | 0 |
| Slew Enable Rag | False | True | False | True |
| Slew gimbal angles (X,Y) | (0.0, 0.0) | (0.0, 0.0) | (0.0, 0.0) | (0.0, 0.0) |
| Max slew rate for gimbals (X,Y) | (0.0, 0.0) | (0.00262, 0.0262) | (0.0, 0.0) | (0.0, 0.0) |
| Track duration | −1 | 0 | 0 | 0 |

Contact state machine processing primarily involves the logic behind executing and transitioning between the following four antenna contact states:

waiting for contact;

in contact;

handover contact; and end contact.

The details of each of these states will be discussed below.

Waiting for contact: If automated control for the current CE is off, the CE is in the past or the CE's no operations flag is true, then go to the end contact state immediately. If automated control is on, the current CE is in the present and current CE transmission type is HGA, then the following:

select the current HGA for the CE if pointing has not yet been achieved and the "Preclude AM's Initial Antenna Selection" flag is FALSE (If the "Preclude AM's Initial Antenna Selection" flag is TRUE, then take the ground provided HGA selection from the CE's "Initial Antenna Selection" field);

verify that AM has not recognized the spacecraft to be in ZOE and verify that the current CE is operational (If one of these verifications is false, then the Telemetry State Machine will be put in the REAL-TIME END state during this cycle and the current CE will be ended during the next cycle); and verify that the current CE's initial antenna selection is set to automatic or that the AM selected antenna is identical to the current CE's initial antenna selection and the AM Selected Antenna Overide is set to TRUE or the AM Selected Antenna Overide is set to FALSE (If these conditions are true and pointing has not yet been achieved, then the appropriate transmitter is selected and a HGA/TDRSS TRACK command is sent to the ACS task; otherwise, the Contact State Machine is put back in the WAITING FOR CONTACT state).

If automated control is on, the current CE is in the present and current CE transmission type is OMNI, then the following:

select the current OMNI antenna; and select the appropriate transmitter.

At this point (i.e., present time—AOS—telemetry start guard), the RF and down-link would be configured via SCP-RTS, and the time at which the current antenna was activated for use would be recorded. The contact state machine would be set to go to the in contact state during the next cycle; however, if during this state AM detected a "Deep State Machine Error", then the telemetry state machine will be put in the real-time end state during this cycle and the current CE will be ended during the next cycle.

In contact state: If the current CE is in the past and the transmission type is HGA, then a command to go park the HGA is sent to the ACS task; otherwise, if the current CE is just in the past, then the Telemetry State Machine will be put in the real-time end state during this cycle, and the current CE will be ended during the next cycle.

If the current CE's transmission type is HGA or OMNI and the antenna/TDRSS contact is occulted at AOS or beyond, then the telemetry state machine will be put in the real-time end state during this cycle, and the current CE will be ended during the next cycle. A command to go park the HGA is sent to the ACS task if the transmission type was HGA and default scheduling was in progress.

If none of the aforementioned situations is true for this state and the transmission type is HGA, then a HGA handover test is performed. Consequently, if a handover situation has occurred and handovers are enabled for the current CE, then the handover process is started by sending a command to track a TDRSS with the other HGA. The current CE will be made to reflect that the contact state machine will be put in the handover state during the next cycle and the time of the initiation of the current track will be recorded; however, if during this state AM detected a "Deep State Machine Error", then the telemetry state machine will be put in the real-time end state during this cycle, and the current CE will be ended during the next cycle.

Handover contact state: If the pointing error for the HGA to be switched to is within the default switch band, the contact state machine sends a command to park the old HGA and configure the transmitters and down-link for the new HGA. The current CE will be made to reflect that the contact state machine will be put in the in-contact state during the next cycle, and the time of the actual handover to the current HGA will be recorded.

If the current CE is in the past, then both HGA's will be parked via a ACS task command, the telemetry state machine will be put in the real-time end state during this cycle and the current CE will be ended during the next cycle.

If the current CE's transmission type is HGA or OMNI, the antenna/TDRSS contact is occulted and default scheduling is in progress, then the telemetry state machine will be put in the real-time end state during this cycle, and the current CE will be ended during the next cycle. Commands to park both antennas are sent to the ACS task.

If during this state AM detected a "Deep State Machine Error", then the telemetry state machine will be put in the real-time end state during this cycle, and the current CE will be ended during the next cycle.

End contact state: When the contact state machine enters the end contact state, it checks the current CE buffer to determine if the telemetry state machine is in the TLM OFF state. If the Telemetry State Machine is not in the TLM OFF state, then the contact state machine will turn off all playback (specified in the current CE's playback mask) and the transmitters (if natural LOS has occurred) and set the current CE buffer to represent the telemetry state machine as being in the real-time end state.

Now that the contact state machine is satisfied that all prior CE activities have been terminated, it will call on a CSP function to get the next CE to process; finally, it sets the next contact state (to be processed during the next AM cycle) to "waiting for contact."

Figure 9:
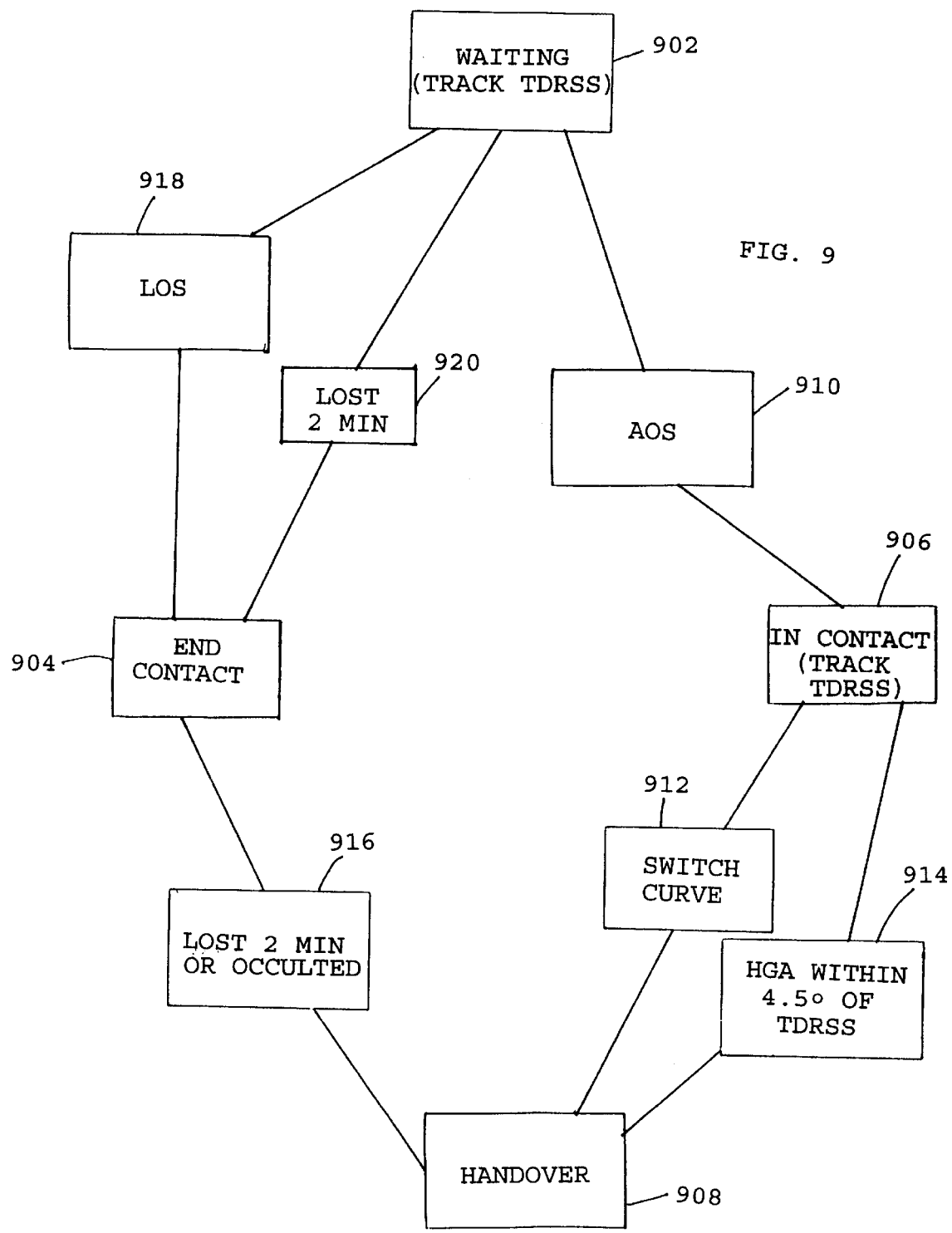
FIG. 9 shows a flow chart of transactions among various contact states according to the preferred embodiment.

The transitions among the various states will be described with reference to FIG. 9. Transition is made:

(a) from waiting state 902 to in-contact state 906 in the event of an acquisition 910 of a signal from the TDRSS;

(b) from in-contact state 906 to handover state 908 when the TDRSS reaches the switch curve in event 912;

(c) from handover state 908 to in-contact state 906 when the orientation of the relevant HGA is within 4.50 of an orientation of the TDRSS respect to the XTE in event 914;

(d) from in-contact state 906 or handover state 908 to end-contact state 904 after a predetermined time period of two minutes after LOS or upon determination that the TDRSS is occulted from the XTE by the earth in event 916;

(e) from waiting state 902 to end-contact state 904 upon LOS 918; and (f) from end-contact state 904 to waiting state 902 after two minutes after LOS in event 920.

Telemetry state machine processing primarily involves the logic behind executing and transitioning between the following five telemetry playback states:

telemetry off real-time start playback paused real-time end (actually playback end)

The details of each of these states will be discussed below.

Telemetry off state: Telemetry will be started with the filter table and rate combination that is specified in the current CE buffer. Also, the current CE buffer telemetry state for the next cycle will be set to the real-time start state if the current CE's automatic control flag is enabled and the following:

transmission type is OMNI, present time is greater than CE.AOS-am_default_gaurd.tlm_start time and present time is less than CE.LOS+am_default_ gaurd.tlm_end time; or transmission type is HGA, present time is greater than CE.AOS-am_default_gaurd.tlm_start time, pointing error is within AM default switch band limits (4.5 degrees), and playback is not scheduled for this CE and playback is not already commanded on in the FDS; or transmission type is HGA, present time is greater than CE.AOS-am_default_gaurd.tlm_start time, pointing error is within AM default switch band limits (4.5 degrees), and playback is scheduled for this CE or playback is already commanded on in the FDS and present time is less than CE.LOS-am_default_ gaurd.playback_end time.

Real-time start state: If the current CE is in the past, then telemetry playback is turned off, and the telemetry state machine is put in the TLM OFF state for the next cycle. If AM recognizes telemetry playback as being commanded on, then the telemetry state machine is put in the playback state for the next cycle, and this state is finished processing for this cycle.

If the playback starting is enabled for the current CE and the CE is not in the past, then the telemetry state machine performs the following:

verify that the current contact state is in contact, that the present time exceeds the default time for starting telemetry playback after acquisition of current HGA/TDRSS contact, that the pointing error is within the default HGA/TDRSS point margin and that receiver lock is acceptable (if these conditions are true, then telemetry playback will be initiated via SCP-RTS, and the telemetry state machine is put in the playback state for the next cycle); and, record the present time if the pointing error is greater than or equal to the default HGA/TDRSS pointing margin and the receiver lock is not acceptable.

If the playback starting is disabled for the current CE and the CE is not in the past, then update the current pointing error each cycle while in this state.

If during this state AM detected a "deep state machine error," then the telemetry state machine will be put in the real-time end state during this cycle, and the current CE will be ended during the next cycle.

Playback state: If the current CE is in the past, then telemetry playback is turned off, and the telemetry state machine is put in the real-time end state for the next cycle. If the current CE is not in the past and the transmission type is HGA, then the following operations must be performed:

verify that the current contact state is not in contact, that the present time does not exceed the default time for starting telemetry playback after acquisition of current HGA/TDRSS contact, that the pointing error is exceeds the default HGA/TDRSS point margin or that receiver lock is not acceptable (if these conditions are true, then telemetry playback will be paused via TO command, and the telemetry state machine is put in the paused state for the next cycle); and record the time of initiation of the paused state.

If during this state AM detects a "deep state machine error", then the telemetry state machine will be put in the real-time end state during this cycle, and the current CE will be ended during the next cycle.

Paused State: If the current CE is in the past, then telemetry is turned off, the capability for FDS telemetry playback will be resumed via TO command, and the telemetry state machine is put in the real-time end state for the next cycle. If the CE is not in the past, then the following operations must be performed:

verify that the current contact state is in contact, that the present time exceeds the default time for starting telemetry playback after acquisition of current HGA/TDRSS contact, that the pointing error is within the default HGA/TDRSS point margin and that receiver lock is acceptable (if these conditions are true, then telemetry playback will be resumed via TO command, and the telemetry state machine is put in the playback state for the next cycle); and record the present time if the pointing error is greater than or equal to the default HGA/TDRSS pointing margin and the receiver lock is not acceptable.

If during this state AM detects a "deep state machine error", then the telemetry state machine will be put in the real-time end state during this cycle, and the current CE will be ended during the next cycle.

Real-time end state: Entering the real-time end state of the contact state machine means that a check to determine if the current CE is in the past (present time >CE.LOS+am_default_guard.tlm_end.secs) will be performed; consequently, if the current CE is in the past, then all types of telemetry playback and the transmitters will be turned off. The current CE buffer telemetry state for the next cycle will be set to the tlm off state.

Figure 10:
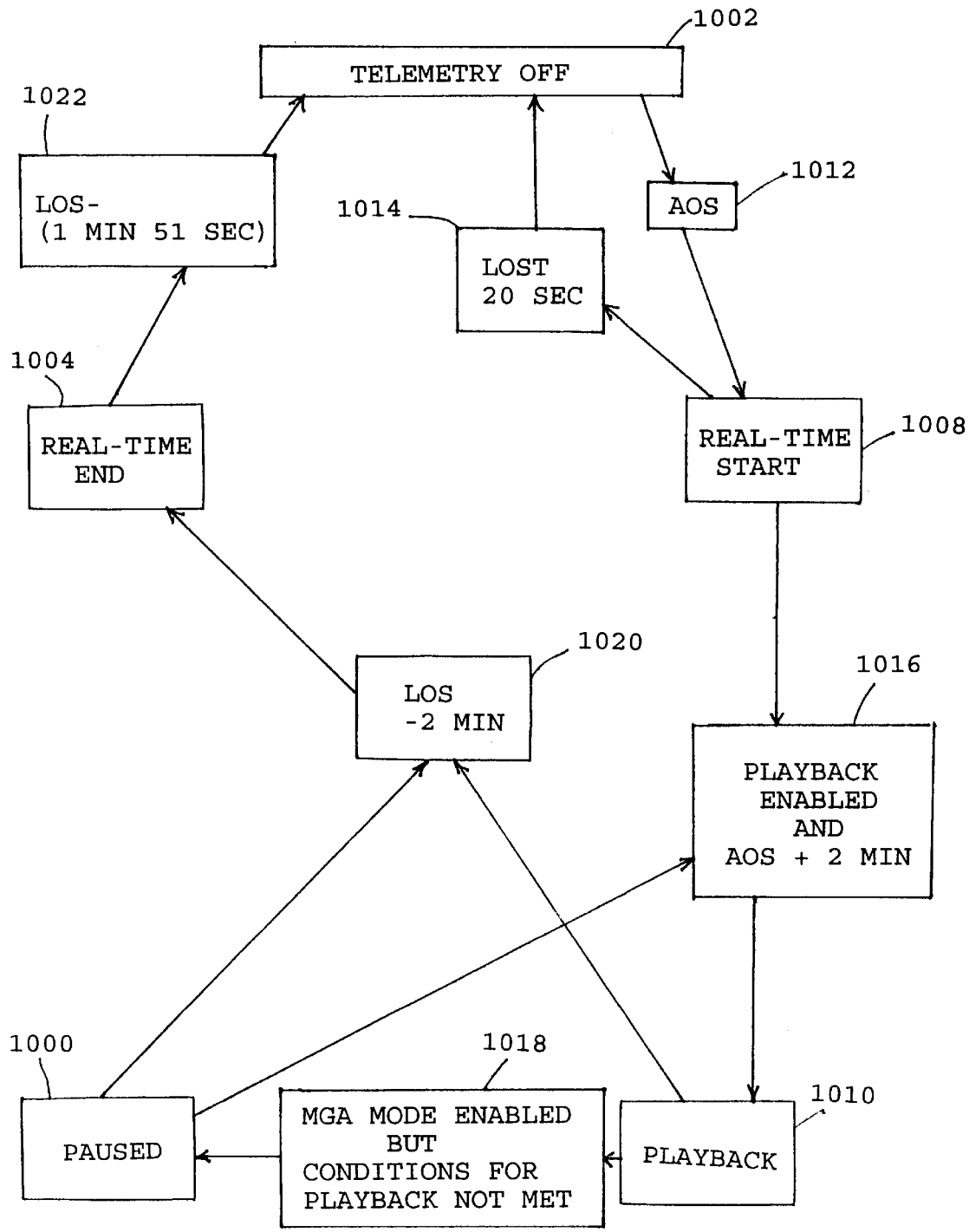
FIG. 10 shows a flow chart of transaction among various telemetry states according to the preferred embodiment.

FIG. 10 shows transitions among the telemetry states. Transition is made:

(a) from telemetry off state 1002 to real-time start state 1008 upon AOS 1012;

(b) from real-time start state 1008 to telemetry off state 1002 20 seconds after LOS in event 1014;

(c) from real-time start state 1008 or paused state 1006 to playback state 1010 when playback is enabled and at least two minutes have elapsed since AOS in event 1016;

(d) from playback state 1010 to paused state 1006 when HGA transmission mode is enabled, but the conditions for playback state 1010 are not met in event 1018;

(e) from playback state 1010 to real-time end state 1004 two minutes before LOS in event 1020;

(f) from paused state 1006 to real-time end state 1004 two minutes before LOS in event 1020; and (g) from real-time end state 1004 telemetry off state 1002 one minute, 51 seconds before LOS in event 1022.

Figure 11:
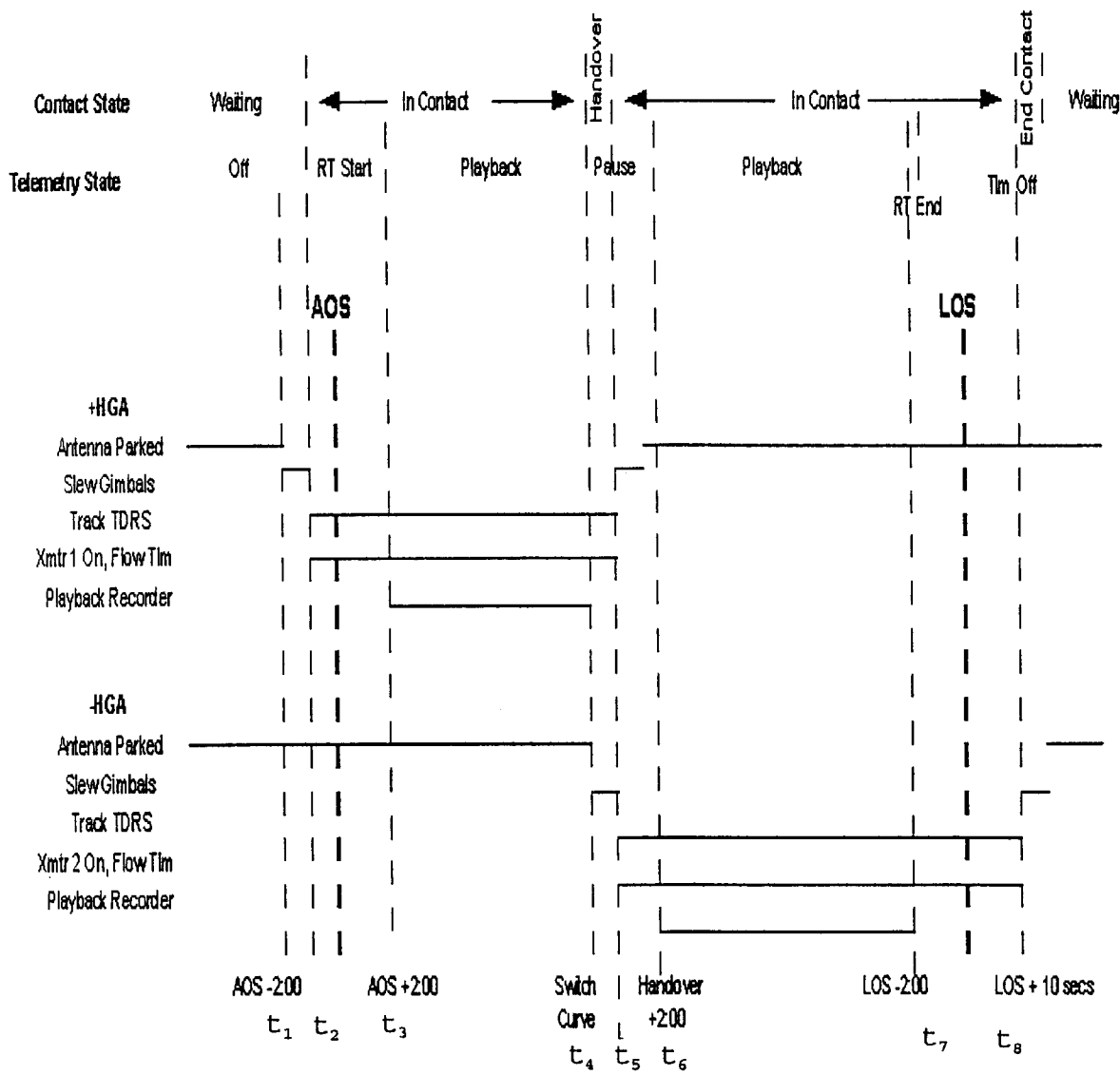
FIG. 11 shows a timing diagram of the preferred embodiment.

FIG. 11 shows a timing diagram of AM, shown at times t, through $t_8$ at which the following events occur:

$t_1$ AM detects 2 minutes before AOS, selects antenna closer to scheduled TDRSS, slews antenna to TDRSS.

$t_2$ AOS—20 seconds, HGA arrives within 4.5_of TDRSS; AM turns transmitter on and begins I-channel telemetry.

$t_3$ 2 minutes past AOS, AM starts Q-channel playback if HGA within 1 degree of TDRSS and if in coherent mode the receiver is locked.

$t_4$ Old antenna arrives at switch curve, new antenna is slewed to TDRSS, Q-channel playback is stopped.

$t_5$ New HGA arrives within 4.5_of TDRSS, old transmitter turned off, old HGA slewed to park, new transmitter turned on, new HGA tracks TDRSS.

$t_6$ 2 minutes past Handover, AM starts Q-channel playback if HGA within 1 degree of TDRSS and if in coherent mode the receiver is locked.

$t_7$ 2 minutes before LOS, AM stops Q-channel playback; I-channel playback; I-channel telemetry continues.

$t_8$ 2 minutes after LOS, AM turns transmitter off and slews HGA to park.

A ninth possible event is not shown because it has no fixed temporal relation to AOS or LOS. If the antenna reaches the edge of the earth (occultation of TDRSS by earth), the antenna is parked, and playback is stopped.

```
/****************************************************************
**
** Function Prolog
**
** Name:   AM_select_antenna
**
** Designers: John Allen, DSC
**            John Azzolini, NASA-GSFC Code 700
**
** Developer: Timothy T. Leath, NASA-GSFC Code 735.3
**
** Purpose: This routine performs initial antenna selection. To
** perform initial antenna selection the following occurs:
**
** 1) the antenna zone in which the TDRS line-of-sight
** lies is computed;
**
** 2) if not in the handover zone, the antenna is
** selected;
**
** 3) if in the handover zone, the track direction is
** computed, and;
**
** 4) the antenna is selected.
**
** Date Written: 2/17/93
**
```

```
   ** Routines Called:
   **
   **   AM_antenna_zone
   **   AM_track_direction
   **
   ** PDL:
   **
   **   process AM_select_antenna(target_tdrs)
   **
   ** Get the switch region by:
   **
   **   antenna_zone = AM_antenna_zone(target_tdrs)
   **
   ** Select initial antenna by:
   **
   ** IF (antenna_zone = POS_ZONE) THEN
   **
   ** antenna = HGAP
   **
   ** ELSEIF (antenna_zone = NEG_ZONE) THEN
   **
   ** antenna = HGAM
   **
   ** ELSE
   **
   ** Compute the direction of latitude change by:
   **
   **   direction = AM_track_direction(target_tdrs)
   **
```

```
**  IF (direction = NEG_ZONE) THEN
**
**  antenna = HGAM
**  last_switch_zone = POSITIVE
****    ELSE
**
**  antenna = HGAP
**  last_switch_zone = NEGATIVE
**
**  ENDIF
**
**  ENDIF
**
**  RETURN (antenna)
**
**  endprocess
**
*/
```

```
/******************************************************************
**
** Function Prolog
**
** Name:   AM_antenna_zone
**
** Designers: John Allen, DSC
** John Azzolini, NASA-GSFC Code 700
**
** Developer: Timothy T. Leath, NASA-GSFC Code 735.3
**
** Purpose:  This routine determines the antenna zone through the
**          following process:
**
** 1) Call AM_comp_lats to compute LOS latitude and sitch
** curve latitude.
**
** 2) the latitudes are compared with to determine the
** antenna zone, using the handover bias.
**
** Date Written: 2/17/93
**
** Routines Called:
**
**   AM_comp_lats
**
** PDL:
**
```

```
**  process AM_antenna_zone (target_tdrs)
**
**  Compute LOS latitude and sitch curve latitude:
**
**  Call AM_comp_lats (lat, sw_lat)
**
**  Determine the antenna zone:
**
**  IF (lat _ sw_lat + handover_bias) THEN
**
**   antenna_zone = POS_ZONE
**
**  ELSE IF (lat _ sw_lat - handover_bias) THEN
**
**   antenna_zone = NEG_ZONE
**
**  ELSE
**
**   antenna_zone = HANDOVER_ZONE
**
**  ENDIF
**
**   RETURN (antenna_zone)
**
**  endprocess
*/
```

```
/******************************************************************
**
** Subroutine Prolog
**
** Name:  AM_comp_lats
**
** Designers: John Allen, DSC
** John Azzolini, NASA-GSFC Code 700
**
** Developer: Timothy T. Leath, NASA-GSFC Code 735.3
**
** Purpose:  This routine determines LOS vector latitude and switch
** curve latitude, for a given TDRS, as follows.
**
** 1) the inertial line of sight (LOS) vector between
** the XTE and the TDRS is computed;
**
** 2) the results of step 1 is transformed to the XTE
** body frame;
**
** 3) the LOS body latitude and longitude are computed;
**
** 4) the switch curve latitude is computed;
**
** Date Written: 9/21/93
**
** Routines Called:
**
```

```
**   AM_acsdcm
**   AM_sw_curve
**
**   PDL:
**
**   procedure AM_comp_lats (lat, sw_lat)
**
**   From the ACS data packet, obtain:
**
**   the XTE orbit vector ([--- Unable To Translate Graphic ---]
)
**   the TDRSS orbit vector ([--- Unable To Translate Graphic ---]
)
**   the current attitude quaternion ([--- Unable To Translate Graphic ---]
)
**
**   Compute the unit body LOS vector by:
**
**   [--- Unable To Translate Graphic ---]

**
**   NOTE: IF [--- Unable To Translate Graphic ---]
above, an error condition exists. It means
**   the XTE and TDRS ephemerides are returning the same
**   value. In this case the antenna manager should be
**   disabled and the ground notified.
**
**   Compute the body latitude and longitude by:
**   [--- Unable To Translate Graphic ---]
```

```
**  IF ([--- Unable To Translate Graphic ---]
) THEN
**   LON = 0
**  ELSE
**  [--- Unable To Translate Graphic ---]

**  ENDIF
**
**  Compute switch curve latitude by:
**
**   sw_lat = AM_sw_curve(lon)
**
**
**  RETURN (lat, sw_lat)
**
**  endprocess
**
*/
```

```
/*****************************************************************
**
** Subroutine Prolog
**
** Name:  AM_handover_test
**
** Designers: John Allen, DSC
**            John Azzolini, NASA-GSFC Code 700
**
** Developer: Timothy T. Leath, NASA-GSFC Code 735.3
**
** Purpose:  This routine determines whether a handover is to occur.
**
** 1) Call AM_comp_lats to compute the LOS latitude and
**    switch curve latitude.
**
** 2) Determine whether a handover is to occur.
**
** Date Written: 9/21/93
**
** Routines Called:
**
**    AM_comp_lats
**
** PDL:
**
**    process AM_handover_test (antenna, TDRS)
**
```

```
**  Compute LOS latitude and switch curve latitude:
**
**  Call AM_comp_lats (lat, sw_lat)
**
**  Determine if a handover is to occur:
**
**  IF (antenna = HGAP) THEN
**    bias = -handover_bias
**  ELSE
**    bias = +handover_bias
**  ENDIF
**
**  IF (lat > sw_lat + bias) THEN
**    switch_zode = POSITIVE
**  ELSE
**    switch_zone = NEGATIVE
**  ENDIF
**
**  NOTE:  last_switch_zone is initialized in AM_select_antenna
**
**  IF (switch_zone _ last_switch_zone) THEN
**    handover_flag = TRUE
**  ENDIF
**
**  last_switch_zone = switch_zone
**
**  NOTE:  handover_flag, and last_switch_zone are assumed to be
**  global
**
```

```
**  RETURN
**
**  endprocess
**
*/
```

```
/ *****************************************************************
 **
 ** Function Prolog
 **
 ** Name:   AM_sw_curve
 **
 ** Designers: John Allen, DSC
 ** John Azzolini, NASA-GSFC Code 700
 **
 ** Developer: Timothy T. Leath, NASA-GSFC Code 735.3
 **
 ** Purpose:  This routine determines the antenna switch curve
 ** latitude for a given longitude.
 **
 ** 1) the routine currently uses a lookup table to
 ** determine the latitude.  This may be modified to
 ** alleviate antenna blockage at a later time.
 **
 ** Date Written: 2/17/93
 **
 ** Routines Called:
 **
 **   none
 **
 ** PDL:
 **
 ** define: sw_amp array [1..360] of REAL
 **
```

```
**  NOTE: The values within sw_amp are TBD, they define the switch
**  curve for handover.
**
**  process AM_sw_curve (lon)
**
**  lon_deg_index = INT(1.0 + (lon + _) * 180.0 / _)
**
**  sw_lat = sw_amp(lon_deg_index)
**
**  RETURN (sw_lat)
**
**  end process
**
*/
```

```
/******************************************************************
**
** Function Prolog
**
** Name:    AM_pointing_err
**
** Designers: John Allen, DSC
**            John Azzolini, NASA-GSFC Code 700
**
** Developer: Timothy T. Leath, NASA-GSFC Code 735.3
**
** Purpose:  This routine determines the pointing error of an antenna
**           to a TDRSS. The following process is carried out to
**           determine pointing error:
**
** 1) the inertial line of sight (LOS) vector between the
**    XTE and the TDRSS is computed;
**
** 2) the result of step 1 is transformed to the XTE body
**    frame;
**
** 3) the actual pointing vector is computed; and,
**
** 4) the inner product of the results of steps 2 and 3 is
**    computed.
**
**
** Date Written: 2/17/93
```

```
**
** Routines Called:
**
** AM_acsdcm
**
** PDL:
**
** process AM_pointing_err (antenna, target_tdrs)
**
** From the ACS data packet obtain:
**
** the XTE orbit vector ([--- Unable To Translate Graphic ---]
)
** the TDRSS orbit vector ([--- Unable To Translate Graphic ---]
)
** the current attitude quaternion ([--- Unable To Translate Graphic ---]
)
**
** the x and y gimbal angles for HGAP, [--- Unable To Translate Graphic ---]

**
** the x and y gimbal angles for HGAM, [--- Unable To Translate Graphic ---]

**
** Compute the unit body LOS vector by:
**
** [--- Unable To Translate Graphic ---]

** NOTE: IF [--- Unable To Translate Graphic ---]
```

```
         above, an error condition exists. It means
      ** the XTE and TDRSS ephemerides are returning the same
      ** value. In this case the antenna manager should be
      ** disabled and the ground notified.
      **
      ** Compute unit actual LOS vector by:
      **
      ** [--- Unable To Translate Graphic ---]

      **
      ** Compute angle error by:
      **
      ** cos_err = [--- Unable To Translate Graphic ---]

      **
      ** IF (cos_err >= 1.0) cos_err = 1.0
      ** IF (cos_err <= -1.0) cos_err = -1.0
      **
      ** pointing_error = arccos(cos_err)
      **
      **  RETURN (pointing_error)
      **
      ** endprocess
      **
      */
```

```
/******************************************************************
**
** Function Prolog
**
** Name:   AM_occulted
**
** Designers: John Allen, DSC
**            John Azzolini, NASA-GSFC Code 700
**
** Developer: Timothy T. Leath, NASA-GSFC Code 735.3
**
** Purpose:  This routine determines if a TDRS is earth occulted.
** The following steps are taken to determine occultation:
**
** 1) the inertial line of sight unit vector between the
**    XTE and the TDRS is computed;
**
** 2) the inner product of the result of step 1 and the
**    unit XTE inertial position vector is computed; and
**
** 3) the result of step 2 is compare with a threshold.
**
**
** Date Written: 2/17/93
**
** Routines Called:
**
**    None
```

```
**
** PDL:
**
** process AM_occulted (target_tdrs)
**
** From the ACS data packet obtain:
**
** the XTE orbit vector ([--- Unable To Translate Graphic ---]
)
** the TDRS orbit vector ([--- Unable To Translate Graphic ---]
)
** Get the constant: cosine of earth occultation angle (cos__)
**
** Compute the cosine of the XTE to TDRS angle (cos_A):
**
** [--- Unable To Translate Graphic ---]

**
** NOTE: If [--- Unable To Translate Graphic ---]
the respective ephemeris is in error.
** In this case, the antenna manager should be disabled and
** the ground notified.
**
** IF ([--- Unable To Translate Graphic ---]
) then
** occulted = TRUE
**
** ELSE
**
```

```
**  occulted = FALSE
**
**  ENDIF
**
**  RETURN (occulted)
**
**  end process
**
*/
```

```
/ ****************************************************************
**
** Function Prolog
**
** Name:  AM_acsdcm
**
** Designers: John Allen, DSC
** John Azzolini, NASA-GSFC Code 700
**
** Developer: Timothy T. Leath, NASA-GSFC Code 735.3
**
** Purpose:  This routine computes the current attitude ( direction
** cosine ) matrix from the current attitude quaternion.
**
**
** Date Written: 2/17/93
**
** Routines Called:
**
**   None
**
** PDL:
**
** process AM_acsdcm (quaternion)
**
** Express the attitude matrix as a function of the quaternion -
** att_matrix[ quaternion ]
**
```

```
**  RETURN (att_matrix)
**
**  endprocess
**
*/
```

```
/******************************************************************
**
** Function Prolog
**
** Name:  AM_track_direction
**
** Designers: John Allen, DSC
** John Azzolini, NASA-GSFC Code 700
**
** Developer: Timothy T. Leath, NASA-GSFC Code 735.3
**
** Purpose:  This routine computes the direction of the change in
** latitude when the antenna is in the handover zone.
** The following process is carried out to determine
** track direction:
**
** 1) the inertial line of sight (LOS) between the XTE and
** the TDRS is computed;
**
** 2) the LOS velocity vector is computed;
**
** 3) the LOS velocity and LOS vectors are transformed to
** the XTE body frame;
**
** 4) the LOS angular rate of change is computed; and
**
** 5) the result of step 4 is tested for a positive or
**    negative direction value.
```

```
     **
     ** Date Written: 2/17/93
     **
     ** Routines Called:
 5   **
     ** None
     **
     ** PDL:
     **
     ** process AM_track_direction (target_tdrs)
     **
     ** From the ACS data packet obtain:
     **
     ** the XTE orbit vector ([--- Unable To Translate Graphic ---]
     )
     ** the TDRS orbit vector ([--- Unable To Translate Graphic ---]
     )
     ** the TDRS orbit velocity vector ([--- Unable To Translate Graphic ---]
     )
     ** the XTE orbital velocity vector ([--- Unable To Translate Graphic ---]
     )
     ** the XTE angular rate ([--- Unable To Translate Graphic ---]
     )
     ** Get Earth Angular Rate parameter: ([--- Unable To Translate Graphic ---]
     )
     ** NOTE: [--- Unable To Translate Graphic ---]
     is a constant (TBS).
     **
     ** Compute inertial LOS vector by:
```

```
       **
       **      [--- Unable To Translate Graphic ---]

**
       **  Compute inertial LOS velocity vector by:
       **
       **      [--- Unable To Translate Graphic ---]

**
       **  Compute attitude direction cosine matrix:
       **
       **  [--- Unable To Translate Graphic ---]

**  Transform LOS velocity vector to body by:
       **
       **      [--- Unable To Translate Graphic ---]

**
       **  Transform LOS vector to body by:
       **
       **      [--- Unable To Translate Graphic ---]

**
       **  Compute the total LOS angular rate of change in the body by:
       **
       **      [--- Unable To Translate Graphic ---]

**
       **  Test for track direction:
```

```
   **
   ** IF ([--- Unable To Translate Graphic ---]
          ) THEN
   **
   ** direction = NEG_ZONE
   **
   ** ELSE
   **
   ** direction = POS_ZONE
   **
   ** ENDIF
   **
   ** RETURN (direction)
   **
   ** endprocess
   **
   */
```

| | |
|---|---|
| Command Name: | AM Reset Counters Command |
| Application ID(Hex): | 0x180C (12) Primary S/C |
| Function Code(Hex): | 1 |
| Data Field Length: | 0 |
| CCSDS Format: | 180C C000 0001 0100 |
| Operation: | This command will reset the following AM counters:<br>AM_HK.cmd_cntr = 0<br>AM_HK.cmd_err_cntr = 0<br>AM_HK.csp_grnd_req_ctr = 0<br>AM_HK.csp_grnd_req_err_ctr = 0<br>AM_HK.csp_patch_ctr = 0<br>AM_HK.csp_patch_err_ctr = 0<br>AM_HK.csp_load_ctr = 0<br>AM_HK.csp_load_err_ctr = 0 |
| Criticality: | None |
| Telemetry Verification: | 1. The above mentioned settings should be reflected in AM telemetry. |
| Error Conditions: | None |
| Command Name: | AM Enable Command |
| Application ID(Hex): | 0x180C (12) Primary S/C |
| Function Code(Hex): | 2 |
| Data Field Length: | 0 |
| CCSDS Format: | 180C C000 0001 0200 |
| Operation: | This command enables AM Contact Entry and Telemetry State Machine processing. If AM is enabled and there is no CES started on the CSP, then default scheduling is initiated. |
| Criticality: | None |
| Telemetry Verification: | The above mention setting should be reflected in the following manner:<br>the AM command counter should increment, and<br>the AM ENABLED tlm item should be TRUE. |
| Error Conditions: | An error condition exists if an attempt to enabled AM is performed under any of the following conditions:<br>AM recognizes that OMNI Mode operations have been commanded on from the ground;<br>AM recognizes that there was no ACS/AM special data provided at the last 1 hz interval;<br>AM recognizes that the ACS/AM special data contained an invalid quaternion or invalid S/C or TDRSS ephemeris flag at the last 1 Hz interval.<br>If an error condition exists, the appropriate command error flags will be incremented and the appropriate event message for the particular error condition will be telemetered. |
| Command Name: | AM Disable Command |
| Application ID(Hex): | 0x180C (12) Primary S/C |
| Function Code(Hex): | 3 |
| Data Field Length: | 0 |
| CCSDS Format: | 180C C000 0001 0300 |
| Data Fields: None | |
| Operation: | This command enables AM Contact Entry and Telemetry State Machine processing. |
| Criticality: | None |
| Telemetry Verification: | The above mention setting should be reflected in the following manner:<br>the AM command counter should increment, and<br>the AM ENABLED tlm item should be FALSE. |
| Error Conditions: | None |
| Command Name: | AM Start CES on the CSP Command |
| Application ID(Hex): | 0x180C (12) Primary S/C |
| Function Code(Hex): | 4 |
| Data Field Length: | 2 |
| CCSDS Format: | 180C C000 0001 0400 xxxx |
| Data Fields: | |

| # | Name | Data Type | Data Range |
|---|---|---|---|
| x | ces_id | u_word | 0..1(CESA or CESB) |

| | |
|---|---|
| Operation: | This command will start processing a particular CES on the CSP assuming that the CSP is not already executing a CES and that the requested CES is LOADED. |

| | |
|---|---|
| Criticality: | None. |
| Telemetry Verification: | AM_HK.curr_ces_id_or_state should indicate that the csp is executing the requested CES.<br>The following items should be incremented:<br>AM_HK.cmd_cntr<br>AM_HK.csp grnd_req_ctr |
| Error Conditions: | If AM attempts to start a CES and it finds that all of the CEs are in the past, an error condition exist where all CEs in the requested CES have been skipped.<br>The following items should be incremented:<br>AM_HK.cmd_err_cntr<br>AM_HK.csp_grnd_req_err_ctr |
| Command Name: | AM Stop Any CES on the CSP Command |
| Application ID(Hex): | 0x180C (12) Primary S/C |
| Function Code(Hex): | 5 |
| Data Field Length: | 0 |
| CCSDS Format: | 180C C000 0001 0500 |
| Data Fields: None | |
| Operation: | Upon receipt of this command, AM will check to see if there are any CESs executing on the CSP. If there is an executing CES, then AM will kill it; consequently, putting the CSP in an idle state. |
| Criticality: | User should be aware that putting the CSP in an IDLE state without disabling AM State Machine processing will invoke. AM default scheduling at the initiation of the next execution cycle. |
| Telemetry Verification: | AM_HK.curr_ces_id_or_state should indicate that the csp is IDLE.<br>The following items should be incremented:<br>AM_HK.cmd_cntr<br>AM_HK.csp_grnd_req_ctr |
| Error Conditions: | If upon receipt of this command AM recognizes that the CSP is already IDLE, then an error condition exist.<br>The following items should be incremented:<br>AM_HK.cmd_err_cntr<br>AM_HK.csp_grnd_req_err_ctr |
| Command Name: | AM Switch CES Command |
| Application ID(Hex): | 0x180C (12) Primary S/C |
| Function Code(Hex): | 6 |
| Data Field Length: | 0 |
| CCSDS Format: | 180C C000 0001 0600 |
| Data Fields: None | |
| Operation: | Upon receipt of this command, AM will check to see if there are any CESs executing on the CSP. If there is an executing or active CES, AM will check to see if the inactive CES is LOADED. If loaded, then AM will set the CE.SWITCH_PEND_ENABLE flag to TRUE telling AM to switch to the currently inactive CES at the end of the current CE. |
| Criticality: | User should know that the actual switch has a delay time of Current CE LOS - the time of the receipt of the SWITCH Command. |
| Telemetry Verification: | AM_HK.curr_switch_pend should be set to TRUE.<br>The following items should be incremented:<br>AM_HK.cmd_cntr<br>AM_HK.csp_grnd_req_ctr |
| Error Conditions: | Upon receipt of this command, AM could recognize any of the following error conditions:<br>the CSP is IDLE;<br>a CES SWITCH has already been commanded;<br>CES to switch to is empty; and<br>all CEs are in the PAST at the actual CSP execution of the switch.<br>The following items should be incremented:<br>AM_HK.cmd_err_cntr<br>AM_HK.csp_grnd_req_err_ctr |
| Command Name: | AM End Current Contact Entry Command |
| Application ID(Hex): | 0x180C (12) Primary S/C |
| Function Code(Hex): | 7 |
| Data Field Length: | 0 |
| CCSDS Format: | 180C C000 0001 0700 |
| Data Fields: None | |

| | |
|---|---|
| Operation: | Upon receipt of this command, AM will turn telemetry and transmitters off and proceed to get the next CE. Retrieving the next CE is performed using the following protocol:<br>check to see if default scheduling has been specified and, if so, load default CE;<br>check to see if a CES switch has been specified and, if so, perform the actual CES switch and get the next CE from the newly activated CES;<br>check to see if a jump to a particular CE is specified and, if so, perform the jump; and<br>retrieve the next CE entry in time from the currently active CES. |
| Criticality: | The current contact should terminate without a problem; however, there could be problems when the CSP attempts to retrieve the next CE. |
| Telemetry Verification: | Upon receipt of this command, the following telemetry items will be useful:<br>AM_HK.am_procssing_enable<br>AM_HK.curr_ce_num<br>AM_HK.next_ce._num<br>AM_HK.jump_pend<br>AM_HK.curr_switch_pend<br>AM_HK.next_switch_pend<br>AM_HK.load_default_ces<br>AM_HK.ce_to_jump_to<br>The following items should be incremented:<br>AM_HK.cmd_cntr<br>AM_HK.csp_grnd_req_ctr |
| Error Conditions: | Upon receipt of this command, AM could recognize any of the following error conditions:<br>the CSP is IDLE;<br>CES to switch to is empty;<br>all CEs are in the PAST at the actual CSP execution of the switch;<br>jump has cause a CE time ordering error (CSP will be IDLE-counters will not be incremented in this case);<br>CE to jump to is now in the past (CSP will be IDLE-counters will not be incremented in this case); and<br>end of CES reached without a CES switch (CSP will be IDLE-counters will not be incremented in this case). |
| Command Name: | AM Jump to Specified CE Command |
| Application ID(Hex): | 0x180C (12) Primary S/C |
| Function Code(Hex): | 8 |
| Data Field Length: | 2 |
| CCSDS Format: | 180C C000 0001 0800 xxxx |
| Data Fields: | |
| Operation: | Upon receipt of this command, AM will set the current CE jump_pend flag so that the CSP will perform the jump at the end of the current CE. |
| Criticality: | None |
| Telemetry Verification: | Upon receipt of this command, the following telemetry items will be useful:<br>AM_HK.am_processing_enable<br>AM_HK.curr_ce_num<br>AM_HK.next_ce_num<br>AM_HK.jump_pend<br>AM_HK.curr_switch_pend<br>AM_HK.next_switch_pend<br>AM_HK.load_default_ces<br>AM_HK.ce_to_jump_to<br>The following items should be incremented:<br>AM_HK.cmd_cntr<br>AM_HK.csp_grnd_req_ctr |
| Error Conditions: | Upon receipt of this command, an error condition will exist under the following conditions:<br>a CES switch is already pending the end of the current CE; or<br>the specified CE to jump to is not loaded or in the past.<br>The following items should be incremented:<br>AM_HK.cmd_err_cntr<br>AM_HK.csp_grnd_req_err_ctr |
| Command Name: | AM Use the Default CE Command |
| Application ID(Hex): | 0x180C (12) Primary S/C |
| Function Code(Hex): | 9 |

-continued

| | | | |
|---|---|---|---|
| Data Field Length: | 0 | | |
| CCSDS Format: | 180C C000 0001 0900 | | |
| Data Fields: None | | | |
| Operation: | Upon receipt of this command, AM will set the CSP CE load_default_ces flag to TRUE which will enable the execution of the default CE at the end of the current CE. The following items should be incremented: AM_HK.cmd_cntr AM_HK.csp_grnd_req_ctr The specifications for the default CE are as follows: AOS is set to the time at the beginning of the execution cycle in which the CSP actually loads the default CE; LOS is set to AOS + the default TDRSS (EAST or WEST) PASS time; PW_STRT_ENABLE is set to TRUE; DL_CONFIG_CODE.RATE_COMBINATION_INDEX is set to TBD; DL_CONFIG_CODE.FILTER_TABLE is set to TBD; DL_CONFIG_CODE.TRANSMISSION_TYPE is set to TBD; DL_CONFIG_CODE.TRANSMISSION_MODE is set to TBD; TARGET_TDRSS is set to either the WEST or the | | |
| Criticality: | The CSP will load the default CE before it does anything else when retrieving the next CE. | | |
| Telemetry Verification: | Processing for this command can be verified in the AM_HK.curr_ce telemetry items along with the AM_HK.load_default_ces flag. | | |
| Error Conditions: | If XTE is in the ZOE and AM can not speak to either TDRSS, then AM will disable AM State Machine processing. | | |
| Command Name: | AM Patch Flags Command | | |
| Application ID(Hex): | 12 (0x180C) Primary S/C | | |
| Function Code(Hex): | 10 (0xA) | | |
| Data Field Length: | 8 | | |
| CCSDS Format: | 180C C000 0001 0A00 tttt uuuu vvww xxyy | | |
| Data Fields: None | | | |

| # | Name | Data Type | Data Range |
|---|---|---|---|
| t | ces_id | u_word | 0..1 (CESA/CESB) |
| u | ce_num | u_word | 1..150 |
| v | pb_strt_enable | u_byte | 0..1 (TRUE/FALSE) |
| w | automat-ic_cntr_enable | u_byte | 0..1 (TRUE/FALSE) |
| x | handovers_enable | u_byte | 0..1 (TRUE/FALSE) |
| y | no_op | u_byte | 0..1 (TRUE/FALSE) |

| | |
|---|---|
| Operation: | Upon receipt of this command, AM checks to see if the specified CES is executing on the CSP. Then AM checks to see if the specified CE for patching is the current or a future CE. Once the requested CE is found, its flags are then patched. |
| Criticality: | All flag data fields in this command must be given valid values that are intended for AM execution for the duration of the specified CE or until the next Patch Flags command is received for the specified CE. |
| Telemetry Verification: | The following telemetry items should be useful in determining how this command is being processed: AM_HK.cmd_cntr AM_HK.csp_grnd_req_ctr AM_HK.curr_ce info AM_HK.next_ce info |
| Error Conditions: | An error condition exist under the following conditions: the specified CES is not currently executing on the CSP; and the specified CE is in the past. |
| Command Name: | AM Omni Mode Transmission Enable Command |
| Application ID(Hex): | 0x180C (12) Primary S/C |
| Function Code(Hex): | 11 (0xB) |
| Data Field Length: | 2 |
| CCSDS Format: | 180C C000 0001 0B00 xxyy |
| Data Fields: | |

| # | Name | Data Type | Data Range |
|---|---|---|---|
| x | rate_com-bination_index | u_byte | 1...9 |
| y | filter_table | u_byte. | 0...8 |

-continued

| | |
|---|---|
| Operation: | Upon receipt of this command, AM does the following: selects the transmitter based on the "other" antenna; specifies omni mode transmission and configures RF down-link; turns telemetry off and restarts telemetry using the specified Omni Mode Down-Link Configuration Code; sets the CE omni_cmded_on flag to TRUE; and sets AM State Machine Processing to FALSE. |
| Criticality: | None |
| Telemetry Verification: | The following telemetry items should be useful in determining how this command is being processed: AM_HK.cmd_cntr AM_HK.am_processing_enable AM_HK.curr_ce.omni_cmded_on |
| Error Conditions: | None that are internal to AM. |
| Command Name: | AM Omni Mode Transmission Disable Command |
| Application ID(Hex): | 0x180C (12) Primary S/C |
| Function Code(Hex): | 12 (0xC) |
| Data Field Length: | 0 |
| CCSDS Format: | 180C C000 0001 0C00 |
| Data Fields: | None |
| Operation: | This command disables AM Omni mode transmission and turns telemetry off. |
| Criticality: | None. |
| Telemetry Verification: | The following telemetry items should be useful in determining how this command is being processed: AM_HK.cmd_cntr AM_HK.am_processing_enable AM_HK.curr_ce.omni_cmded_on |
| Error Conditions: | An error condition exist if this command is received and Omni Mode has not been enabled. |

AM can cause the following event and exception notices to be displayed on a monitor at the ground station to inform a user of its operational state:

1) "SAM000 AM Task Initialized; XTE B3 Ver. 1.0"

This event is displayed upon completion of AM initialization, both cold and warm. This event is triggered in the AM_task_init routine.

2) "SAM001 No Recent ACS/AM 1 Hz Data; AM Disabled!"

This event is displayed upon AM's recognition that there has not been a special ACS/AM communication packet sent within the last 10 seconds of the last special ACS/AM packet. This event implies that all AM State Machine processing has been disabled. This event is triggered in the AM_process_cmd_tlm routine.

3) "SAM002 ACS/AM 1 Hz Pipe ERROR!"

This event is displayed when AM receives a Software Bus status other than "normal" or "timed out" on the special AM/ACS communication pipe. This event could imply any of the following things:

pipe exceeded buffer quota on stream;

pipe exceeded queue capacity; or internal VRTX error.

If AM State Machine processing has been enabled, this event does not imply that AM State Machine processing has been disabled. This event is triggered in the AM_process cmd_tlm routine.

4) "SAM039 AM/SM Miss-Comm. of CES ID for LOAD OR PATCH"

This event is displayed when AM does not recognize the CES ID provided by the Software Manager Task's request for a Load or a Patch of an AM CES. AM has to know how to interpret SM's Table of Tables index representation of it's CES buffers. The AM command error counter will be incremented. This event is triggered in the AM_process cmd_tlm routine.

5) "SAM003 Unable to Enable AM; should Disabled OMNI first!"

This event is displayed when AM receives a ground request to enable its State Machine processing and AM has previously been commanded to go into OMNI mode. The AM command error counter will be incremented. This event is triggered in the AM_process cmd_tlm routine.

6) "SAM004 No ACS/AM 1 Hz Data Available!"

This event is displayed when AM receives a ground request to enable its_State Machine processing and AM has not received a special AM/ACS communication packet recently. The AM command error counter will be incremented. This event implies that AM was not enabled. This event is triggered in the AM_process_cmd_tlm routine.

7) "SAM037 Invalid Quaternion provided; AM DISABLED!"

This event is displayed when AM receives a ground request to enable its State Machine processing and AM has not received a valid quaternion in the special AM/ACS communication packet recently. The AM command error counter will be incremented. This event implies that AM was not enabled. This event is triggered in the AM_process_cmd_tlm routine.

This event is also displayed at the point when AM recognizes that it has not received a valid quatemion in the special AM/ACS communication packet. At this point AM State Machine processing has been disabled. This event is triggered in the AM_upd_acshga_data routine to enable its State Machine processing and AM has not received a valid flag for S/C or TDRSS ephemeris in the special AM/ACS communication packet recently. The AM command error counter will be incremented. This event implies that AM was not enabled. This event is triggered in the AM_process_cmd_tlm routine.

This event is also displayed at the point when AM recognizes that it has not received a valid flag for S/C or TDRSS ephemeris in the special AM/ACS communication packet. At this point AM State Machine processing has been disabled. This event is triggered in the AM_upd_acshga_data routine.

9) "SAM005 CES has been Started on CSP!"

This event is displayed when AM receives a ground request to start a CES and the following are true:
   the CSP is not executing; and
   the requested CES has at least one CE that is loaded and not in the past.

The AM command counter will be incremented. This event is triggered in the AM_process_cmd_tlm routine.

10) "SAM025 ALL the CEs were SKIPPED!"

This event is displayed when AM receives a ground request to start a CES and the following are true:
   the CSP is not executing; and
   the requested CES has at least one or more CE's that are loaded and in the past.

The AM command error counter will be incremented. This event is triggered in the AM_process_cmd_tlm routine.

This event is also displayed when AM receives a ground request to switch a CES and the following are true:
   the CSP is executing; and
   the requested CES has at least one or more CE's that are loaded and in the past.

The AM command error counter will be incremented. This event is triggered in the AM_service_switch routine.

11) "SAM006 Unable to START CES;CSP is EXECUTING or is not LOADED!"

This event is displayed when AM receives a ground request to start a CES and the following are true:
   the CSP is executing; and
   the requested CES does not have at least one CE's that is loaded.

The AM command error counter will be incremented. This event is triggered in the AM_process_cmd_tlm routine.

12) "SAM007 CES on CSP STOPPED!"

This event is displayed when AM receives a ground request to stop a CES and AM thinks that the CSP is executing. The AM command counter will be incremented. This event is triggered in the AM_process cmd_tlm routine.

13) "SAM008 Unable to STOP CES; CSP already IDLE!"

This event is displayed when AM receives a ground request to stop a CES and AM thinks that the CSP is not executing. The AM command error counter will be incremented. This event is triggered in the AM_process_cmd_tlm routine.

14) "SAM009 Unable to DISABLE OMNI Mode; Not yet ENABLED!"

This event is displayed when AM receives a ground request to stop AM OMNI Mode processing. The AM command error counter will be incremented. This event is triggered in the AM_process_cmd_tlm routine.

15) "SAM010 Invalid APP. ID!"

This event is displayed when AM receives a CCSDS packet off of it's command and telemetry pipe which has an invalid Application ID associated with it. The AM command error counter will be incremented. This event is triggered in the AM_process_cmd_tlm routine.

16) "SAM011 PATCHED Current Ces' Flags!"

This event is displayed when AM receives a ground request to patch the currently executing CE and the patch was successful. The AM command counter will be incremented. This event is triggered in the AM_patch_flags routine.

17) "SAM012 PATCHED Future CEs' Flags!"

This event is displayed when AM receives a ground request to patch a future CE and the patch was successful. The AM command counter will be incremented. This event is triggered in the AM_patch_flags routine.

18) "SAM013 CE specified for PATCHING is in the past!"

This event is displayed when AM receives a ground request to patch a CE that is in the past. The AM command error counter will b14 CES Load Content Error; LOAD REJECTED!"

This event is displayed when AM receives an on-board SM request to load a CES and the load has the following types of content errors:
   the load does not have enough time allocated within any particular CE's AOS and LOS to allow for telemetry playback;
   the load does not have enough time allocated between any CE's LOS and the following CE's AOS.

The SM CES load commit reply will be rejected and the AM command error counter will be incremented. This event is triggered in the AM_load_ces routine.

20) "SAM015 CES Load Sizing Error; LOAD REJECTED!"

This event is displayed when AM receives an on-board SM request to load a CES and the load has a buffer overrun. The SM CES load commit reply will be rejected and the AM command error counter will be incremented. This event is triggered in the AM_load_ces routine.

21) "SAM016 Requested CES is being Used; LOAD REJECTED!"

This event is displayed when AM receives an on-board SM request to load a CES and the specified CES is executing on the CSP. The SM CES load commit reply will be rejected and the AM command error counter will be incremented. This event is triggered in the AM_load_ces routine.

22) "SAM017 CES PATCH Sizing Error; PATCH REJECTED!"

This event is displayed when AM receives an on-board SM request to patch a CES and the patch has a buffer overrun. The SM CES patch commit reply will be rejected and the AM command error counter will be incremented. This event is triggered in the AM_patch_ces routine.

23) "SAM018 Unable to PATCH; CES is EMPTY or not EXECUTING!"

This event is displayed when AM receives an on-board SM request to patch a CES and the specified CES is executing on the CSP. The SM CES patch commit reply will be rejected and the AM command error counter will be incremented. This event is triggered in the AM_patch_ces routine.

24) "SAM019 ALL CEs were SKIPPED; CES not PATCHED!"

This event is displayed when AM receives a ground request to patch a CES and the following are true:
   the CSP is executing the CES specified for patching; and
   the requested CES has at least one or more CE's that are loaded and in the past.

The AM command error counter will be incremented. This event is triggered in the AM_patch_time_ndx routine.

25) "SAM020 CES PATCH Content Error; PATCH REJECTED!"

This event is displayed when AM receives an on-board SM request to patch a CES and the patch has the following types of content errors:

the patch does not have enough time allocated within any particular CE's AOS and LOS to allow for telemetry playback;

the patch does not have enough time allocated between any CE's LOS and the following CE's AOS.

The SM CES patch commit reply will be rejected and the AM command error counter will be incremented. This event is triggered in the AM_patch_ces routine.

26) "SAM021 CES SWITCH already pending on end of Current CE!"

This event is displayed when AM receives a ground request to switch to the other CES and a switch request is already pending. The AM command error counter will be incremented. This event is triggered in the AM_switch_ces routine.

This event is also displayed when AM receives a ground request to jump to a particular CE in a CES and a switch request is already pending. The AM command error counter will be incremented. This event is triggered in the AM_jump to_entry routine.

27) "SAM022 CES SWITCH FAILURE; Target CES is EMPTY!"

This event is displayed when AM receives a ground request to switch to the other CES and the other CES is not loaded. The AM command error counter will be incremented. This event is triggered in the AM_switch_ces routine.

28) "SAM023 CES SWITCH FAILURE; CSP is IDLE!"

This event is displayed when AM receives a ground request to switch to the other CES and the CSP is not executing. The AM command error counter will be incremented. This event is triggered in the AM_switch_ces routine.

29) "SAM024 CES SWITCHED-The following CES is EXECUTING:"

This event is displayed when AM receives a ground request to switch to the other CES and the switch is successful. The AM command counter will be incremented. This event is triggered in the AM_switch_ces routine.

30) "SAM026 Unable to JUMP; CE in the Past or not LOADED!"

This event is displayed when AM receives a ground request to jump to a particular CE in the active CES and the CE does not exist or is in the past. The AM command error counter will be incremented. This event is triggered in the AM_jump_to_entry routine.

31) "SAM027 XTE in ZOE; Auto. Opps. DISABLED for Clt scheduling or when AM receives a ground request to execute the default CE while it is executing the active CES and AM determines that it is unable to communicate with either antenna. In the case of the ground command, the AM command counter will be idle for the allotted time for that default CE. This event is triggered in the AM_load_default_entry routine.

32) "SAM028 JUMP caused Time Ordering Error; AM and CSP DISABLED!"

This event is displayed when AM receives a ground request to jump to a particular CE in the active CES and the search for the specified CE's Time Index causes an error. The AM command error counter will not be incremented in this case because this is more of an AM CSP processing error; consequently, such an error will put the CSP's normal scheduling in idle mode and switch to default scheduling. This event is triggered in the AM_get_next_entry routine.

33) "SAM029 CE to JUMP to is now in the PAST!"

This event is displayed when AM receives a ground request to jump to a particular CE in the active CES and the specified CE is now in the past. The AM command error counter will not be incremented in this case because this is more of an AM CSP processing error; consequently, such an error will put the CSP's normal scheduling in idle mode and switch to default scheduling. This event is triggered in the AM_get_next_entry routine.

34) "SAM030 End of CES reached without a CES SWITCH; CSP is IDLE!"

This event is displayed when the AM CSP is attempting to retrieve the next CE and it detects the end of a CES load without the switch pending flag set. The AM error counter will not be incremented in this case because this is more of an AM CSP processing error; consequently, such an error will put the CSP's normal scheduling in idle mode and switch to default scheduling. This event is triggered in the AM_get_next_entry routine.

35) "SAM031 HGA/TDRSS Occultation occurred!"

This event is displayed when AM is performing Contact State Machine. processing and is in the IN_CONTACT state. If HGA transmission mode was specified for the current CE, then the HGA will be parked and the current CE will be terminated. This event is triggered in the following routines:

AM_in_contact; and

AM_handover_contact.

36) "SAM033 Pointing Error Calc. Anomaly; AM DISABLED!"

This event is displayed when AM is attempting to determine the pointing error between the current CE's target TDRSS and HGA and has found the LOS vector to be the zero vector. This event implies that AM State Machine processing will be disabled. This event is triggered in the AM_pointing_err routine.

37) "SAM034 Unable to START PB; Invalid Mask specified!"

This event is displayed when AM's Telemetry State Machine is attempting to start playback and the recorder mask provided in the current CE is not greater than zero. This event implies that AM State Machine processing will be disabled for the current CE . This event is triggered in the AM_start_playback routine.

38) "SAM035 Occultation Calc. Anomaly; AM DISABLED!"

This event is displayed when AM is attempting to determine the occultation between the spacecraft and the target TDRSS and has found the spacecraft vector or the LOS vector to be the zero vector. This event implies that AM State Machine processing will be disabled. This event is triggered in the AM_occulted routine.

39) "SAM036 Compute Latts Calc. Anomaly; AM DISABLED!"

This event is displayed when AM is attempting to determine the LOS vector latitude and switch curve latitude for a given TDRSS and has found the LOS vector to be the zero vector. This event implies that AM State Machine processing will be disabled. This event is triggered in the AM_comp_lats routine.

While a preferred embodiment has been disclosed with reference to a specific type of satellite, those skilled in the art who have reviewed this disclosure will readily appreciate that the present invention can be adapted to other satellites or otherwise modified as needed. Therefore, the present invention should be construed as limited only by the following claims.

We claim:

1. A satellite antenna management system comprising:
    a first antenna, attached to a first satellite, having an upper coverage region, wherein said upper region includes a lower boundary;
    a second antenna, attached to the first satellite, having a lower coverage region, wherein said lower region includes an upper boundary;
    a spherical coverage region about the first satellite being formed by said lower and upper coverage regions;
    a handover zone within the spherical coverage region being defined by the upper boundary of the lower region and the lower boundary of the upper region;
    and a processor on-board the first satellite having a state machine for controlling handing over between the first and second antennas during communication between the first satellite and a contact within the handover zone so that the spherical coverage region is maintained regardless of an attitude of the first satellite.

2. The system of claim 1 wherein the handover zone encompasses a switch curve.

3. The state machine of the system of claim 2 further comprises a waiting state, an in-contact state, an end-contact state and a handover state, wherein each of the antennas is capable of being placed in one of these states by the state machine.

4. The state machine of the system of claim 3 further comprising a telemetry-off state, a real-time-start state, a playback state and a pause state, wherein each of the antennas is capable of being placed in one of these states by the state machine.

5. The antenna management system of claim 4 wherein the processor further comprises means for initializing the processor, means for performing a control cycle, and a contact schedule processor operation, said contact schedule processor operation determining a schedule of contacts between the satellite and the contact.

6. The system of claim 5 wherein the contact is a second satellite moving between the upper and lower coverage regions.

7. A method of satellite antenna management comprising the steps of:
    (a) defining a spherical coverage region about a first satellite by an upper coverage region of a first antenna attached to a first satellite and a lower coverage region of a second antenna attached to the first satellite;
    (b) defining a handover zone in the spherical region by an upper boundary of the lower coverage region and a lower boundary of the upper coverage region;
    (c) defining a switch curve in the handover zone; and
    (d) controlling, by a state machine, handing over between the first and second antennas during communication between the first satellite and a contact wherein said contact is within the handover zone, so that the spherical coverage region is maintained regardless of an attitude of the first satellite.

8. The method of claim 7 wherein step (d) comprises the substeps of changing each antenna:
    (i) from a waiting state to an in-contact state in the event of an acquisition of a signal from the contact;
    (ii) from the in-contact state to a handover state when the contact reaches the switch curve;
    (iii) from the handover state to the in-contact state when an orientation of one of the antennas is within a predetermined range of an orientation of the contact with respect to the first satellite;
    (iv) from the in-contact state or the handover state to the end-contact state after a predetermined time period after a loss of signal from the contact or upon determination that the contact is occulted from the satellite by the earth;
    (v) from the waiting state to the end-contact state upon the loss of signal from the contact; and
    (vi) from the end-contact state to the waiting state after the predetermined time period after the loss of signal from the contact.

9. The method of claim 8 further comprising the step of:
    (e) controlling each of the antennas to be in one of a telemetry-off state, a real-time-start state, a playback state, a real-time-end state and a pause state.

10. The method of claim 9 wherein step (e) comprises the substeps of changing each antenna:
    (i) from the telemetry-off state to the real-time-start upon an acquisition of signal from the contact;
    (ii) from the real-time-start state to the telemetry-off state when a predetermined time period has elapsed from a loss of signal from the contact;
    (iii) from the real-time-start state to the playback state when playback is enabled and a second predetermined time period has elapsed since the acquisition of signal;
    (iv) from the playback state to the pause state when a transmission mode is enabled, but the second predetermined time period has not elapsed since the acquisition of signal; and
    (v) from the playback state to the real-time end state in a third predetermined time period before the loss of signal;
    (vi) from the pause state to the real-time end state in the third predetermined time period before the loss of signal; and
    (vii) from the real-time end state to the telemetry off state in a fourth predetermined time period before the loss of signal.

11. The method of claim 9 further comprises the steps of:
    (f) initializing a processor by a control and initialization operation; and
    (g) performing a control cycle by the control and initialization operation, wherein said performing a control cycle comprises the substeps of:
        (i) controlling, by a command and telemetry handler operation, transmission of telemetry data to the contact and receipt of commands from the contact by way of one of the antennas,
        (ii) determining, by a contact schedule processor operation, a schedule of contacts between the first satellite and the contact by a contact schedule processor operation, called by the control and initialization operation during the control cycle,
        (iii) determining whether the state machine has been enabled,
        (iv) if the state machine has been enabled, determining whether the contact schedule processor operation is idle and if so, loading a default contact entry into a contact buffer, and
        (v) repeating operations (i)–(iv) until the processor is restarted.

* * * * *